(12) United States Patent
Matsuyama et al.

(10) Patent No.: US 9,440,867 B2
(45) Date of Patent: Sep. 13, 2016

(54) ELECTROLYSIS WATER-MAKING APPARATUS

(75) Inventors: Koki Matsuyama, Tokyo (JP); Tatsuya Midorikawa, Yokohama (JP)

(73) Assignee: Morinaga Milk Industry Co., Ltd., Tokyo (JP)

( * ) Notice: Subject to any disclaimer, the term of this patent is extended or adjusted under 35 U.S.C. 154(b) by 0 days.

(21) Appl. No.: 13/700,636

(22) PCT Filed: May 23, 2011

(86) PCT No.: PCT/JP2011/061746
§ 371 (c)(1),
(2), (4) Date: Jan. 28, 2013

(87) PCT Pub. No.: WO2011/152237
PCT Pub. Date: Dec. 8, 2011

(65) Prior Publication Data
US 2013/0146449 A1    Jun. 13, 2013

(30) Foreign Application Priority Data
May 31, 2010 (JP) ................................. 2010-124880

(51) Int. Cl.
*C25B 9/00* (2006.01)
*C25B 1/04* (2006.01)
*C25B 9/18* (2006.01)
(Continued)

(52) U.S. Cl.
CPC ......... *C02F 1/46104* (2013.01); *C02F 1/4674* (2013.01); *C02F 2201/4611* (2013.01); *C02F 2303/14* (2013.01)

(58) Field of Classification Search
CPC .............. C25B 9/18; C25B 13/02; C02F 1/46
USPC ......................................... 204/242, 193, 194
See application file for complete search history.

(56) References Cited

U.S. PATENT DOCUMENTS 5,798,028 A    8/1998   Tsuchikawa et al.
6,096,177 A    8/2000   Kamitani et al.
(Continued)

FOREIGN PATENT DOCUMENTS

CN         1232887 A      10/1999
CN       101514040 A       8/2009
(Continued)

OTHER PUBLICATIONS

English Translation of JP11-235378 to Kato (1999).*
(Continued)

*Primary Examiner* — Zulmariam Mendez
(74) *Attorney, Agent, or Firm* — Wood, Herron & Evans, LLP

(57) ABSTRACT

An electrolysis water-making apparatus (1) generates electrolyzed products by supplying a raw material solution into an electrolytic cell (4) to perform electrolysis, and generates electrolyzed water by diluting the electrolyzed products. The electrolysis water-making apparatus (1) includes a casing (20) configured to accommodate the electrolytic cell (4), and a bracket (30) fixed to the casing (20) in a freely detachable manner, and the bracket (30) includes a pair of rigid walls to which one end and the other end of the electrolytic cell (4) are attached. The pair of rigid walls have a dimension therebetween that can be adjusted according to the linear dimension of the electrolytic cell (4).

12 Claims, 17 Drawing Sheets

(51) Int. Cl.
*C02F 1/46* (2006.01)
*C02F 1/461* (2006.01)
*C02F 1/467* (2006.01)

(56) References Cited

U.S. PATENT DOCUMENTS

2005/0087446 A1* 4/2005 Liang et al. ............ 204/524
2010/0147700 A1* 6/2010 Field et al. ............ 205/687

FOREIGN PATENT DOCUMENTS

| JP | 06226258 A | 8/1994 |
|---|---|---|
| JP | 10174972 A | 6/1998 |
| JP | 11169856 A | 6/1999 |
| JP | 11235378 A | 8/1999 |
| JP | 11253953 A | 9/1999 |
| JP | 2001062455 A | 3/2001 |
| JP | 2004209347 A | 7/2004 |
| JP | 2005035670 A | 2/2005 |
| JP | 2005520051 A | 7/2005 |
| JP | 201058052 * 3/2010 | ............ C02F 1/46 |
| JP | 2010069441 A | 4/2010 |

OTHER PUBLICATIONS

English Translation of JP201058052 to Matsuyama; 2010.*
International Search Report issued in International Application No. PCT/JP2011/061746, dated Jul. 5, 2011, 6 pages.
Taiwan Patent Office, Office Action issued for Taiwan application 100118108, mailed on Jul. 30, 2013, 8pp. incl. English translation.
Chinese Patent Office, Office Action issued in Chinese Patent Application No. 201180026772.7, mailed Aug. 22, 2013, 12 pp.

* cited by examiner

ELECTROLYSIS WATER-MAKING APPARATUS

TECHNICAL FIELD

The present invention relates to an electrolysis water-making apparatus for making electrolyzed water used as sterilized water by electrolyzing a raw material solution.

Priority is claimed on Japanese Patent Application No. 2010-124880 filed on May 31, 2010, the contents of which are incorporated by reference herein.

BACKGROUND ART

In the related art, electrolyzed water obtained by performing electrolysis on a solution including chlorine ions is known to have a low available chlorine concentration and a high chlorine sterilizing effect, and to have an advantageous property of high safety for humans. The electrolyzed water is used to sterilize foods and instruments for processing the foods in food-related fields, or the like.

In particular, in recent times, since accurate quality/sanitary management of foods and goods for treating the foods is strongly required, utilization of the electrolysis water-making apparatus for making the electrolyzed water (sterilized water) is further expected.

The electrolysis water-making apparatus includes an electrolytic cell configured to perform electrolysis on a raw material solution such as a hydrochloric acid solution or the like, a tank of a raw material solution such as hydrochloric acid or the like, a water supply system, a pump configured to pump a hydrochloric acid solution/dilution water or the like, an installation base of an electrolytic cell or the like, a mixer, a pipe group configured to connect the elements of this equipment, an electrolysis power supply configured to supply power to the electrolytic cell, and so on. For example, the apparatuses disclosed in the following Patent Documents 1 and 2 have been proposed as the conventional electrolysis water-making apparatus.

In these electrolysis water-making apparatuses, a productive capacity of electrolysis is determined and a manufacturing capacity of electrolyzed water of the electrolysis water-making apparatus is determined by the total electrode surface area of electrode plates assembled to the electrolytic cell. The conventional electrolysis water-making apparatus is configured such that one kind of electrolytic cell is incorporated with one apparatus. For this reason, the manufacturing capacity of electrolyzed water is different in the respective electrolysis water-making apparatuses. Then, a user selects and uses an apparatus capable of generating a necessary amount of electrolyzed water from various kinds of electrolysis water-making apparatuses having a predetermined manufacturing capacity of electrolyzed water.

In addition, in the conventional electrolysis water-making apparatus, the electrolytic cell or the like can be replaced with a new one to prepare a case in which the lifespan of an electrode plate is terminated due to use or a tube or a diaphragm of the pump is deteriorated. Replacement of the electrolytic cell is performed through a task of replacing the inside of the respective members by water from a chloride solution and electrolyzed products such that the chloride solution and electrolyzed products or a gas in the electrolytic cell or the like does not leak and stick to a body or clothes.

RELATED ART DOCUMENT

Patent Document

[Patent Document 1] Japanese Unexamined Patent Application, First Publication No. H11-169856

[Patent Document 2] Japanese Unexamined Patent Application, First Publication No. 2001-62455

SUMMARY OF THE INVENTION

Problems to be Solved by the Invention

However, the amount of electrolyzed water required by the user is not always constant. For this reason, one apparatus may exceed a capability of the electrolysis water-making apparatus or may cause lack of a generation capability. Then, in order to change the capacity of the electrolyzed water, the electrolysis water-making apparatus should be separately prepared to replace the entire apparatus with a new one, increasing cost or causing inconvenience in installation space. For this reason, development of an electrolysis water-making apparatus that can be replaced with respect to different electrolytic cells to correspond to a change in the demand of electrolyzed water is expected.

In addition, in the related art, replacement of the electrolytic cell is performed through a task of replacing the inside of the electrolytic cell or a piping by water. This water should be used in the replacement task only and then discarded after the task. In addition, time is consumed for the task of replacing the inside of electrolytic cell or the inside of piping by water. From the above, in order to enable replacement of the electrolytic cell of the electrolysis water-making apparatus according to the generation capability, the replacement task of water may be omitted so that the replacement process can be simply performed.

Means for Solving the Problems

According to a first aspect of the present invention, an electrolysis water-making apparatus for generating electrolyzed products by supplying a raw material solution into an electrolytic cell to perform electrolysis, and generating electrolyzed water by diluting the electrolyzed products, includes a casing configured to accommodate the electrolytic cell; and a bracket fixed to the casing in a freely detachable manner. The bracket includes a pair of rigid walls to which one end and the other end of the electrolytic cell are attached. The pair of rigid walls have a dimension therebetween that is adjustable according to a linear dimension of the electrolytic cell.

According to a second aspect of the present invention, a pressure pump configured to pump the raw material solution into the electrolytic cell is attached to the bracket.

According to a third aspect of the present invention, the electrolysis water-making apparatus further includes a dilution water feed pump configured to pump dilution water into the electrolytic cell. The dilution water feed pump is attachable to the bracket.

According to a fourth aspect of the present invention, the dilution water feed pump is attached to the bracket at a variable angle.

According to a fifth aspect of the present invention, the casing includes a main body casing; a first base frame fixed to a bottom plate of the main body casing; and a second base frame installed at the first base frame in a freely disjunctive manner, and fixed to the bottom plate in a freely detachable manner. One of the pair of rigid walls included in the bracket is fixed to the first base frame included in the casing. The other of the rigid walls included in the bracket is fixed to the second base frame included in the casing.

According to a sixth aspect of the present invention, the casing includes a main body casing; a first base frame fixed to a bottom plate of the main body casing; and a second base frame installed at the first base frame in a freely disjunctive manner, and fixed to the bottom plate in a freely detachable manner. A plurality of brackets having different dimensions between the rigid walls according to the linear dimension of the electrolytic cell are provided. The bracket is fixed between the first and second base frames in a state in which the electrolytic cell is fixed.

According to a seventh aspect of the present invention, the casing includes a main body casing; a first base frame fixed to a bottom plate of the main body casing; and a second base frame flexibly installed with respect to the first base frame, and a fixation mechanism configured to fix the first and second base frames at an original position is provided.

Effects of the Invention

According to the electrolysis water-making apparatus of the present invention, the above-mentioned means has the following effects.

That is, according to the electrolysis water-making apparatus in accordance with the first aspect of the present invention, the electrolytic cell is attached to the bracket detachably attached to the installation base. The bracket can adjust the rigid walls according to the linear dimension of the electrolytic cell. For this reason, the electrolytic cells having various different dimensions can be assembled to one electrolysis water-making apparatus, and manufacturing capacity of electrolyzed water can be changed.

In addition, the electrolytic cell is attached to the bracket, and the bracket is detachably attached to the casing. For this reason, the attachment process of the electrolytic cell can be performed outside the casing, and the replacement process of the electrolytic cell can be easily performed.

According to the electrolysis water-making apparatus in accordance with the second aspect of the present invention, the electrolytic cell and the pump are integrally removed from the installation base by the bracket, and treatment of liquid in the electrolytic cell or the pump can be performed after movement to the outside of the casing. For this reason, in replacement of the electrolytic cell or the pump, a process of replacing the inside of the electrolytic cell by water can be omitted, and working efficiency of the replacement can be increased.

In addition, since the process of replacing the inside of the electrolytic cell with water can be omitted, water can be saved.

Further, since waste liquid treatment in the electrolytic cell or the like can be performed outside the casing, the process can be easily and safely performed. Furthermore, since the liquid in the casing does not easily spill out, a cleaning process of the casing can be omitted.

In addition, in order to enable the replacement of the electrolytic cell, since only the bracket to which the electrolytic cell and the pump are integrally attached is used, the structure of the electrolysis water-making apparatus can be simplified to reduce the manufacturing cost.

According to the electrolysis water-making apparatus in accordance with the third aspect of the present invention, the dilution water feed pump can be attached to the bracket. For this reason, the bracket can be extracted to the outside of the casing to perform the replacement process of the dilution water feed pump, and thus the replacement process becomes easy.

According to the electrolysis water-making apparatus in accordance with the fourth aspect of the present invention, when the dilution water feed pump is attached to the bracket, an angle between the dilution water feed pump and the bracket can be appropriately selected to perform the attachment. For this reason, for example, when workability is bad due to interference with the piping of the dilution water feed pump, the dilution water feed pump can be attached to the bracket by varying the angle of the dilution water feed pump, and the workability can be further improved.

According to the electrolysis water-making apparatus in accordance with the fifth aspect of the present invention, the second base frame fixed to the casing is installed at the first base frame in a freely disjunctive manner. For this reason, the position of the second base frame can be freely set to match the linear dimension of the bracket, and the bracket and the electrolytic cell can be stably and securely attached in the casing.

According to the electrolysis water-making apparatus in accordance with the sixth aspect of the present invention, the electrolytic cell is fixed to the installation base of the casing by selecting the bracket having the rigid walls formed to match the dimension of the electrolytic cell. For this reason, the electrolytic cell can be simply attached to the bracket, the configuration of the bracket can be extremely simplified, and thus the manufacturing cost of the bracket can be reduced.

According to the electrolysis water-making apparatus in accordance with the seventh aspect of the present invention, the fixation mechanism configured to fix the first and second base frames at an original position is provided. For this reason, the second base frame can be securely fixed in the casing without using a separate fixture, and settings of the base frame can be easily performed.

BRIEF DESCRIPTION OF THE INVENTION

MODES FOR CARRYING OUT THE INVENTION

Hereinafter, embodiments of an electrolysis water-making apparatus according to the present invention will be described with reference to the accompanying drawings.

Here, a raw material solution including chlorine ions, which are a raw material of electrolyzed water, is, for example, water including chlorine ions such as a sodium chloride solution, a hydrochloric acid solution, or the like.

The electrolysis water-making apparatus according to the present invention perform electrolysis on the above-mentioned raw material solution, generates chlorine gas by action of electrolytic oxidation, and dissolves the generated chlorine gas in water, generating hypochlorous acid in the water.

Figure 1:
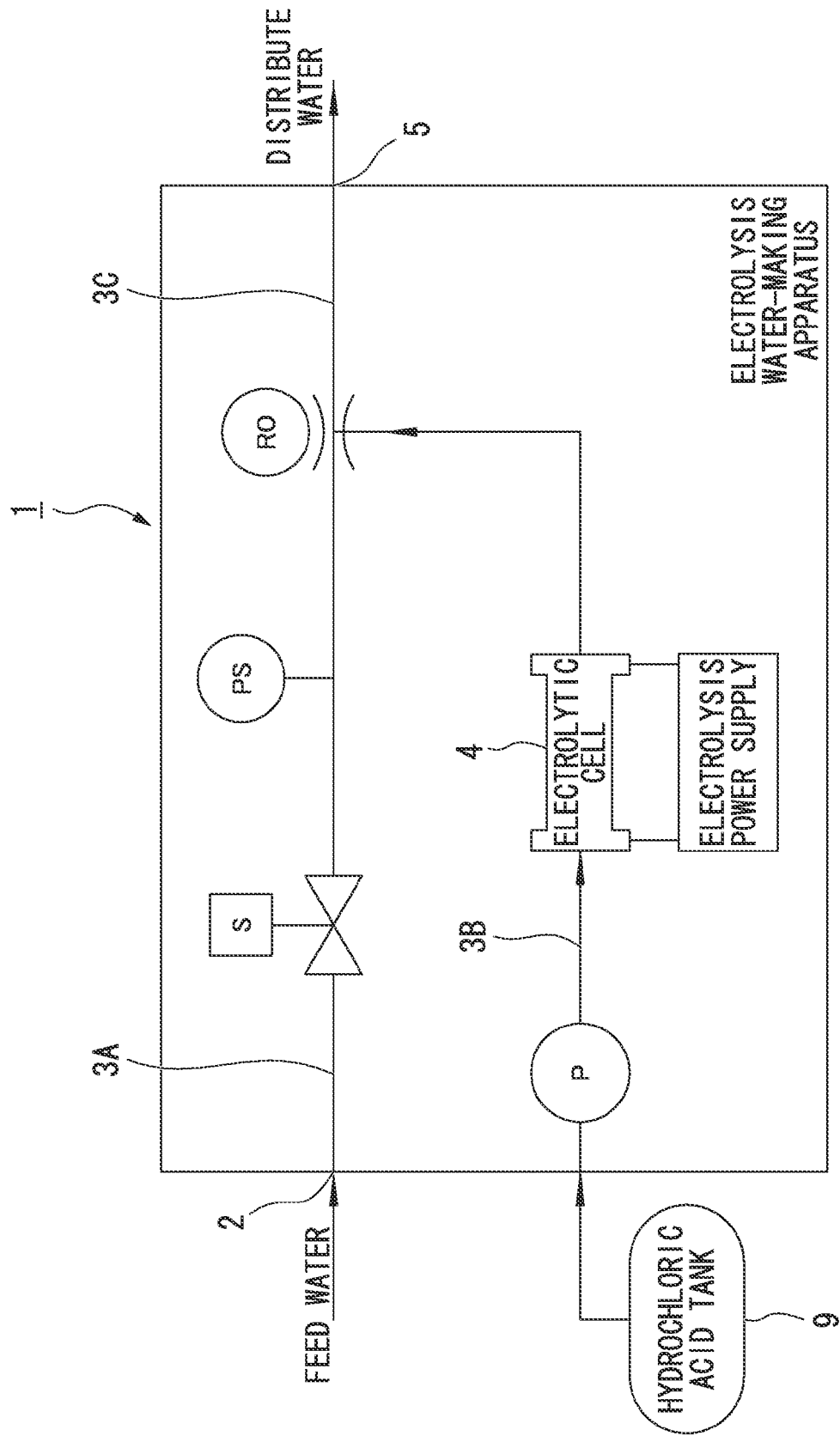
FIG. 1 is a view schematically showing a configuration of an electrolysis water-making apparatus according to a first embodiment of the present invention.

As shown in FIG. 1, an electrolysis water-making apparatus 1 includes a raw water line 3A through which raw water (dilution water) flowing from a raw water inlet 2 flows, an electrolyzed products line 3B configured to supply a hydrochloric acid solution, which is a raw material solution, into an electrolytic cell 4 of the electrolysis water-making apparatus 1 and extract electrolyzed products electrolytically treated in the electrolytic cell 4, and an electrolysis water supply line 3C configured to dilute the generated electrolyzed products in the electrolyzed products line 3B and supply electrolyzed water, which becomes the final sterilized water, into an output port 5.

Figure 2:
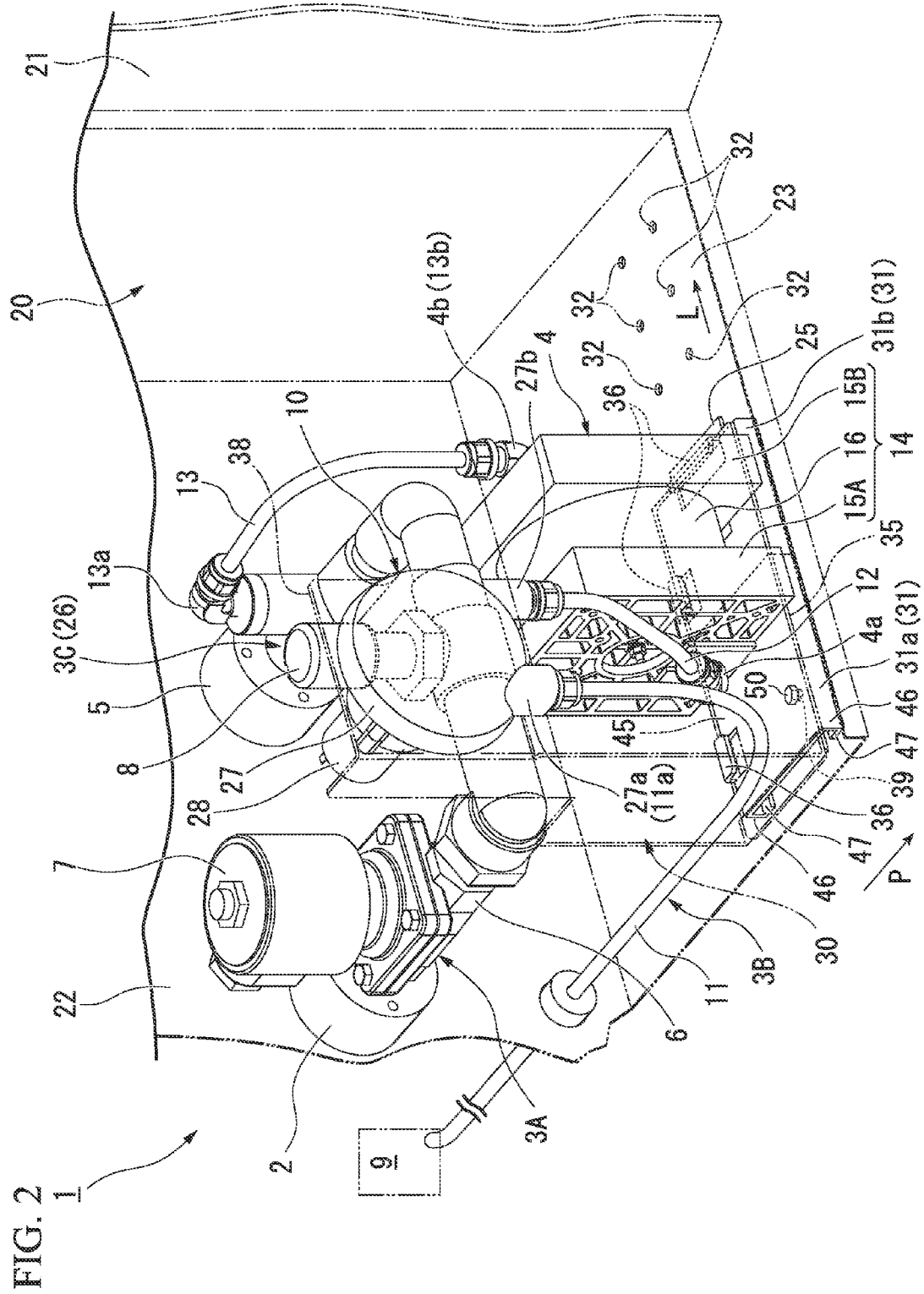
FIG. 2 is a perspective view showing the inside of the electrolysis water-making apparatus according to the first embodiment of the present invention.

As shown in FIG. 2, the respective lines 3A to 3C are accommodated in a casing 20 having a substantially rectangular shape, except for a storage tank 9. For this reason, an opening/shutting door 21 installed as one sidewall of the casing 20 is opened, and the respective parts can undergo proper maintenance, periodic inspection, and so on.

The raw water line 3A is configured by installing a strainer (not shown), an on-off valve (a solenoid valve) 7, a pressure switch 8, and a check valve (not shown) at a water supply line 6 through which raw water flowing from the raw water inlet 2 flows. The on-off valve (the solenoid valve) 7 opens/closes a flow of the raw water at a downstream side of a strainer. The pressure switch 8 controls a pressure of the raw water flowing in a piping at a downstream side of the solenoid valve 7. The check valve prevents a backward flow of the raw water.

In the water supply line 6, the raw water inlet 2 and the output port 5 of the electrolyzed water are attached to an intermediate section in a vertical direction of a sidewall 22 of the casing 20.

The electrolyzed products line 3B includes the storage tank 9 configured to store a hydrochloric acid solution, a pressure pump 10 configured to extrude the hydrochloric acid solution from the storage tank 9 and pump the hydrochloric acid solution to the electrolytic cell 4, and the electrolytic cell 4 configured to electrolyze the pumped hydrochloric acid solution. The storage tank 9 and the pump 10 are connected to each other by a first piping 11. The pump 10 and the electrolytic cell 4 are connected to each other by a second piping 12. Further, the electrolytic cell 4 and the electrolysis water supply line 3C are connected to each other by a third piping 13.

In this configuration, a connection-point 11a of the first piping 11 and the pump 10 is disposed over the storage tank 9, and is configured such that the hydrochloric acid solution in the piping flows to the storage tank 9 when the first piping 11 is removed from the connection-point 11a. In addition, the pump 10 is disposed over the electrolytic cell 4, and is configured such that the hydrochloric acid solution in the pump 10 easily flows to the electrolytic cell 4. A connection-point 13a of the electrolysis water supply line 3C and the third piping 13 is disposed over a connection-point 13b of the electrolytic cell 4 and the third piping 13, and is configured such that the electrolyzed products in the third piping 13 are stored in the piping 13 not to easily spill out when the third piping 13 is removed from the connection-point 13a.

All of the first to third pipings 11, 12 and 13 are configured by a flexible tube. For this reason, connection of the piping can be easily performed even when connecting positions of the respective elements are different due to a difference in manufacturing capacity of electrolyzed water of the electrolysis water-making apparatus 1. In addition, a connector (not shown) is connected to the electrolytic cell 4, and power is supplied from an electrolysis power supply.

The electrolytic cell 4 is configured such that a unit cell configured to electrolyze the hydrochloric acid solution is formed in a chassis 14. The chassis 14 includes side plates 15A and 15B, and a body 16. The chassis 14 is formed of plastics such as polyvinyl chloride, polycarbonate, acrylate, and so on. While the electrolytic cell 4 will be described below in detail, treatment capability of the hydrochloric acid solution can be differentiated by increasing or decreasing the number of electrode plates, or the like, disposed in the body 16. The body 16 included in the chassis 14 is configured to have different linear dimensions according to the number of electrode plates, or the like.

The side plates 15A and 15B are rectangular plates having a predetermined thickness. The inlet 4a configured to introduce the hydrochloric acid solution is formed under the side plate 15A. An outlet 4b (the connection-point 13b) configured to extract the electrolyzed products, which are electrolytically treated, is formed over the side plate 15B.

In addition, a male screw hole (not shown) into which a bolt is threaded is formed at the side plates 15A and 15B.

The side plates 15A and 15B are set to an appropriate size corresponding to a diameter dimension of the body 16.

Figure 3:
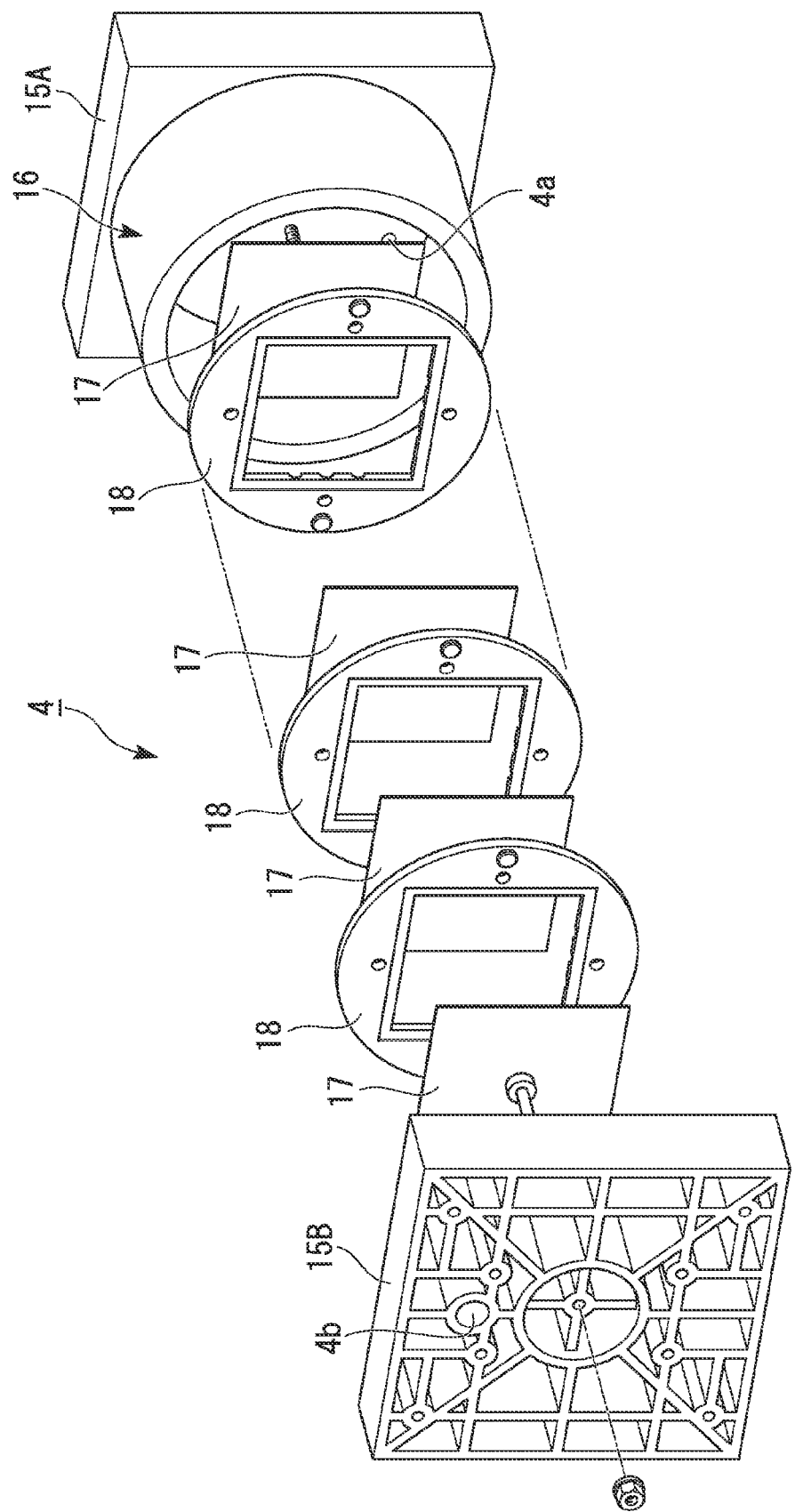
FIG. 3 is an exploded perspective view showing a configuration of an electrolytic cell of the electrolysis water-making apparatus according to the first embodiment of the present invention.

As shown in FIG. 3, the body 16 is a member having a cylindrical shape. In an inner space of the body 16, a plurality of electrode plates 17, 17 . . . and a plurality of spacers 18, 18 . . . configured to support the electrode plates 17, 17 . . . and form the unit cell are serially installed in a direction perpendicular to a center axis of the body 16. The electrolytic cell 4 is configured such that the raw material solution in the electrolytic cell 4 is electrolyzed by electrical conduction to the plurality of electrode plates 17, 17 . . . .

The side plates 15A and 15B are disposed and fixed to water-tightly cover both end apertures of the body 16.

In addition, as shown in FIG. 2, the pump 10 is constituted by a pump body 27 having a disc shape, and an actuator 28. The pump body 27 accommodates a tube and a rotor configured to rotate a roller to crush the tube, and moves the hydrochloric acid solution in the tube by rotation of the rotor. The actuator 28 drives the rotor. An inlet 27a (the connection-point 11a) configured to suction the hydrochloric acid solution and a delivery 27b configured to pump the hydrochloric acid solution into the electrolytic cell 4 are formed under the pump body 27.

The electrolytic cell 4 and the pump 10 are integrally attached to a bracket 30 and fixed to an installation base 31 in freely detachable manner in the casing 20 via the bracket 30. The bracket 30 makes the replacement process easy when the treatment capability of the electrolytic cell 4 is changed or the electrolytic cell 4 having a decreased generation capability is replaced with a new one.

The installation base 31 is a member constituting a portion of the casing 20. The installation base 31 is formed to approach the opening/shutting door 21 side (hereinafter referred to as "in front of a casing") of the casing 20 over a bottom plate 23, and is constituted by a first base frame 31a and a second base frame 31b, which are separable in one direction.

The first base frame 31a is constituted by a flat plate area 45 having a substantially rectangular shape, side plates 46 and 46 hanging beneath both edges of a front side and a rear side of the casing, and lower edges 47 and 47 of the plate bent in a direction in which the lower edges approach each other from lower ends of the side plates 46 and 46. The lower edges 47 and 47 of the plate are fixed onto the bottom plate 23 by welding.

Figure 4:
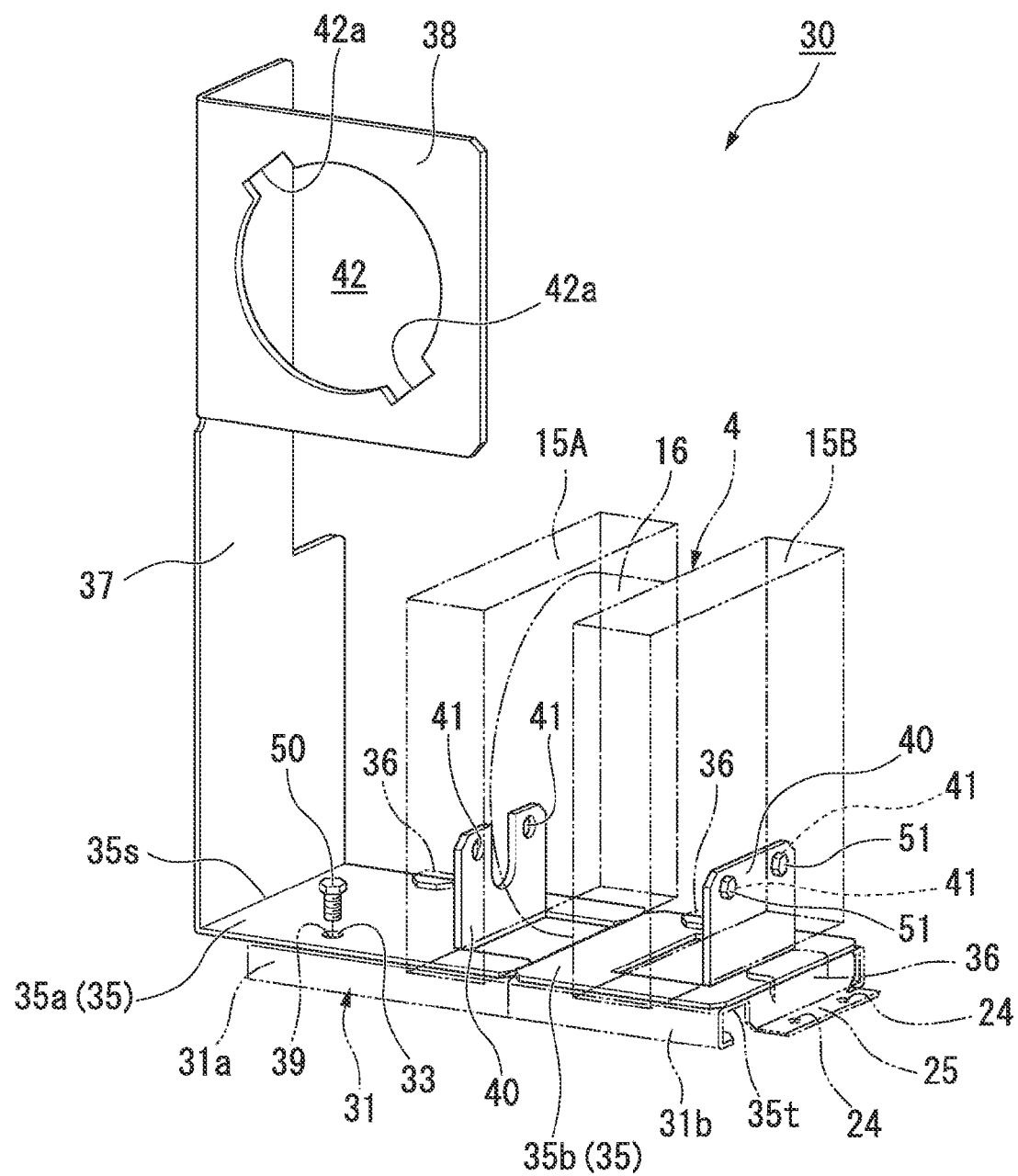
FIG. 4 is a perspective view showing a bracket of the electrolysis water-making apparatus according to the first embodiment of the present invention.

The second base frame 31b is a member having substantially the same shape as the first base frame 31a. As shown in FIG. 4, an outside fixed plate 25 having through holes 24 and 24 is installed at a front end 35t of the second base frame 31b. The second base frame 31b is securely fixed to the bottom plate 23 in the outside fixed plate 25 with a bolt (not shown) inserted into the through hole 24.

As shown in FIG. 2, male screw holes 32, 32 . . . in communication with the through holes 24 and 24 are formed in the bottom plate 23 of the casing 20 at a position to which the outside fixed plate 25 of the second base frame 31b is fixed, and a bolt can be threaded into the bottom plate 23. The male screw holes 32, 32 . . . are installed in a direction of an arrow L in plural rows, and are set such that the second base frame 31b can be fixed to a position matching the dimension of the bracket 30 to which the electrolytic cell 4 having various dimensions are attached.

In addition, as a unit configured to fix the bracket 30 to the installation base 31, a male screw hole 39 into which a bolt 50 is threaded is formed in the front of the casing of the first base frame 31a, and catching plates 36, 36 . . . configured to hold a bottom wall 35 of the bracket 30 are formed.

The catching plates 36 and 36 are formed by edges of a casing rear side of the first and second base frames 31a and 31b, and a plate-shaped member bent toward the inside of the first and second base frames 31a and 31b after standing upward in the front end 35t of the second base frame 31b shown in FIG. 4.

The bracket 30 is formed by bending a sheet material formed of metal, plastic, or the like. As shown in FIG. 4, the bracket 30 includes the bottom wall 35 fixed to upper surfaces of the installation bases 31a and 31b and attachable to the electrolytic cell 4, a side wall 37 vertically standing up from the edge 35s of a side portion of the bottom wall 35, and a pump fixing portion 38 extending from a side edge in a vertical direction forming the side wall 37 in a direction perpendicular to the side wall 37.

The bottom wall 35 of the bracket 30 is constituted by first and second sheet materials 35a and 35b separated from each other and having a substantially rectangular shape. Rigid walls 40 and 40 having through holes 41 and 41 formed in wall sections, which are standing up, are formed at the first and second sheet materials 35a and 35b, respectively.

With respect to the bottom wall 35, the electrolytic cell 4 is disposed between the rigid walls 40 and 40 separated from each other to have a size slightly larger than the linear dimension of the electrolytic cell 4, and bolts 51 and 51 are threaded and fixed into the male screw holes of the through holes 41 and 41 and the side plates 15A (one end of the electrolytic cell 4) and 15B (the other end of the electrolytic cell). In this case, the electrolytic cell 4 is disposed between the first and second sheet materials 35a and 35b.

In addition, a through hole 33 in communication with the male screw hole 39 formed in the installation base 31 is formed in the first sheet material 35a of the bottom wall 35. The bottom wall 35 is detachably attached to the installation base 31 by inserting and securing the bolt 50 into the through hole 33 and the male screw hole 39 while an end of the bottom wall 35 is disposed under the catching plates 36, 36 . . . of the installation base 31.

The side wall 37 of the bracket 30 has the pump fixing portion 38 formed thereon. The side wall 37 is configured such that the pump 10 shown in FIG. 2 and attached to the pump fixing portion 38 can be disposed at a higher dimension than the storage tank 9 and the electrolytic cell 4.

The pump fixing portion 38 is formed to extend from an upper side edge of the side wall 37 along the opening/shutting door 21 of the casing 20. An aperture 42 configured to mount the pump 10 is formed inside the pump fixing portion 38.

As shown in FIG. 2, in the pump 10, the actuator 28 is inserted into the aperture 42 shown in FIG. 4, and the pump body 27 and the pump fixing portion 38 are fixed by a fixture (not shown).

As shown in FIG. 4, the pair of hooks 42a and 42a are formed at the aperture 42. Then, on the other hand, a pair of catching plates (not shown) snap-fitted to the hook 42a protrude from a rear side (a side in contact with the pump fixing portion 38) of the pump body 27 of the pump 10. As will be described below, the hook 42a is fitted to the catching plate of the pump 10 to reach a location of installation of the pump 10.

That is, when the pump 10 is attached to the bracket 30, first, the actuator 28 is inserted into the aperture 42. At this time, a pair of catching plates (not shown) formed at a rear side of the pump body 27 are inserted to be fitted to the pair of hooks 42a and 42a formed at the aperture 42. As the hooks 42a and 42a are fitted to the pair of catching plates of the pump 10, an angle of the pump 10 with respect to the bracket 30 always becomes a certain angle, and the pump 10 is prevented from being pivoted with respect to the bracket 30.

Then, the pump 10 is appropriately fixed by a pump body 17 and a fastener such as a bolt or a clip (not shown) installed at the pump fixing portion 38 with the pump fixing portion 38 interposed therebetween.

The electrolysis water supply line 3C dilutes the electrolyzed products extracted from the electrolytic cell 4 by the raw water of the water supply line 6, and configures a dilution method 26 of generating electrolyzed water. The electrolysis water supply line 3C is formed at the most downstream end of the water supply line 6.

As described above, the water supply line 6, the electrolytic cell 4, the pump 10, and a portion of the pump 10 side of the first piping 11, the second and third pipings 12 and 13, which connect them, are accommodated in the casing 20. The electrolytic cell 4 and the pump 10 are integrally and detachably attached to the bracket 30 such that they can be easily extracted from the opening/shutting door 21 of the casing 20. Further, the bracket 30 is securely fixed to the installation base 31 in the casing 20 by the bolt 50.

Figure 6:
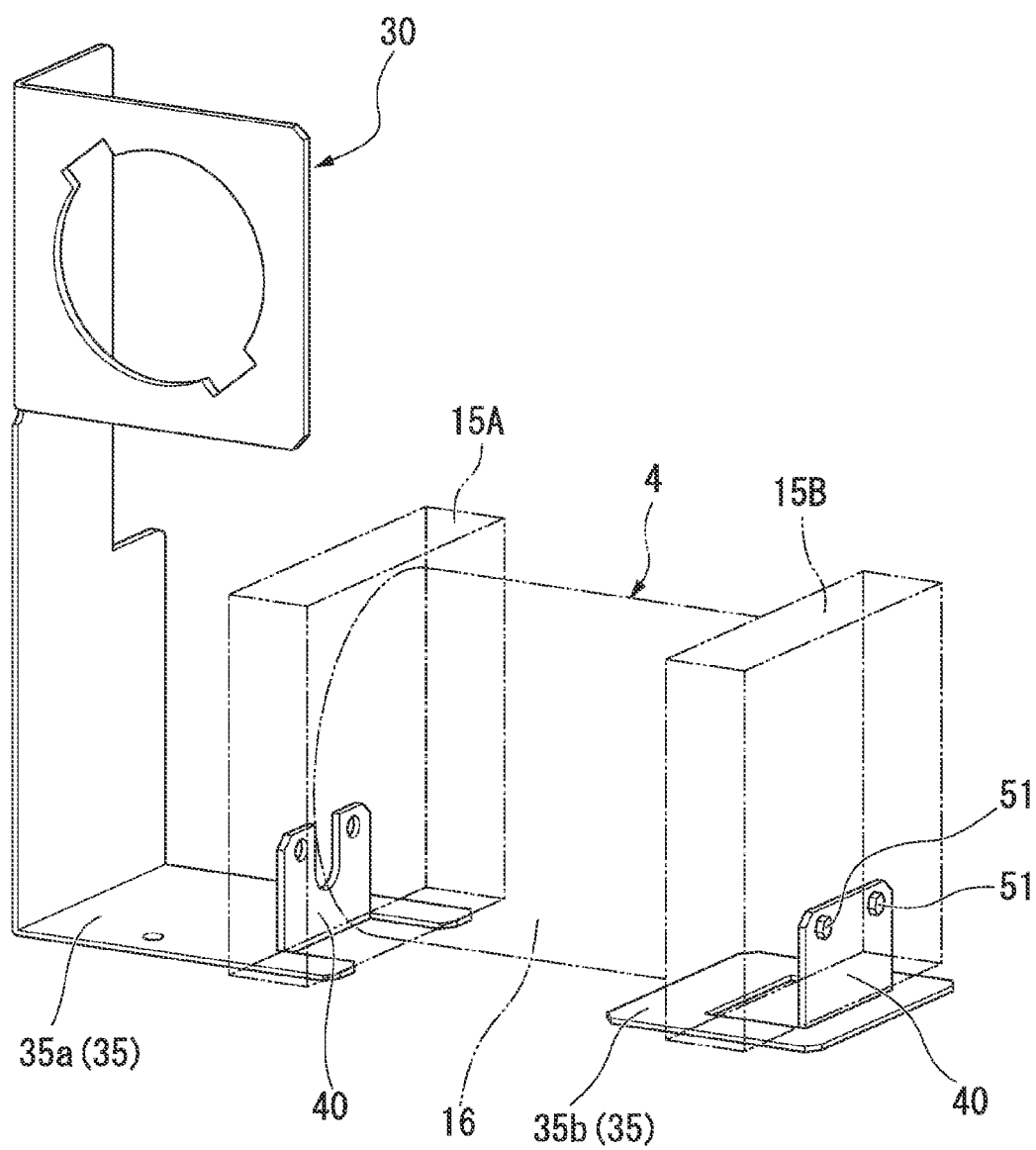
FIG. 6 is a perspective view showing the bracket of the electrolysis water-making apparatus according to the first embodiment of the present invention.

Next, in the electrolysis water-making apparatus 1 having the above-mentioned configuration, a method of replacing the electrolytic cell 4 having the small dimension shown in FIG. 4 with the electrolytic cell 4 having the large dimension shown in FIG. 6 will be described.

First, a power supply of the electrolysis water-making apparatus 1 is turned OFF, and a flow of the hydrochloric acid solution and raw water is stopped. Then, the opening/shutting door 21 of the casing 20 is opened, and the bolt 50 fixed to the installation base 31 is removed. Accordingly, the bracket 30 can be extracted in front of the casing of the installation base 31 (a direction of an arrow P).

Figure 5:
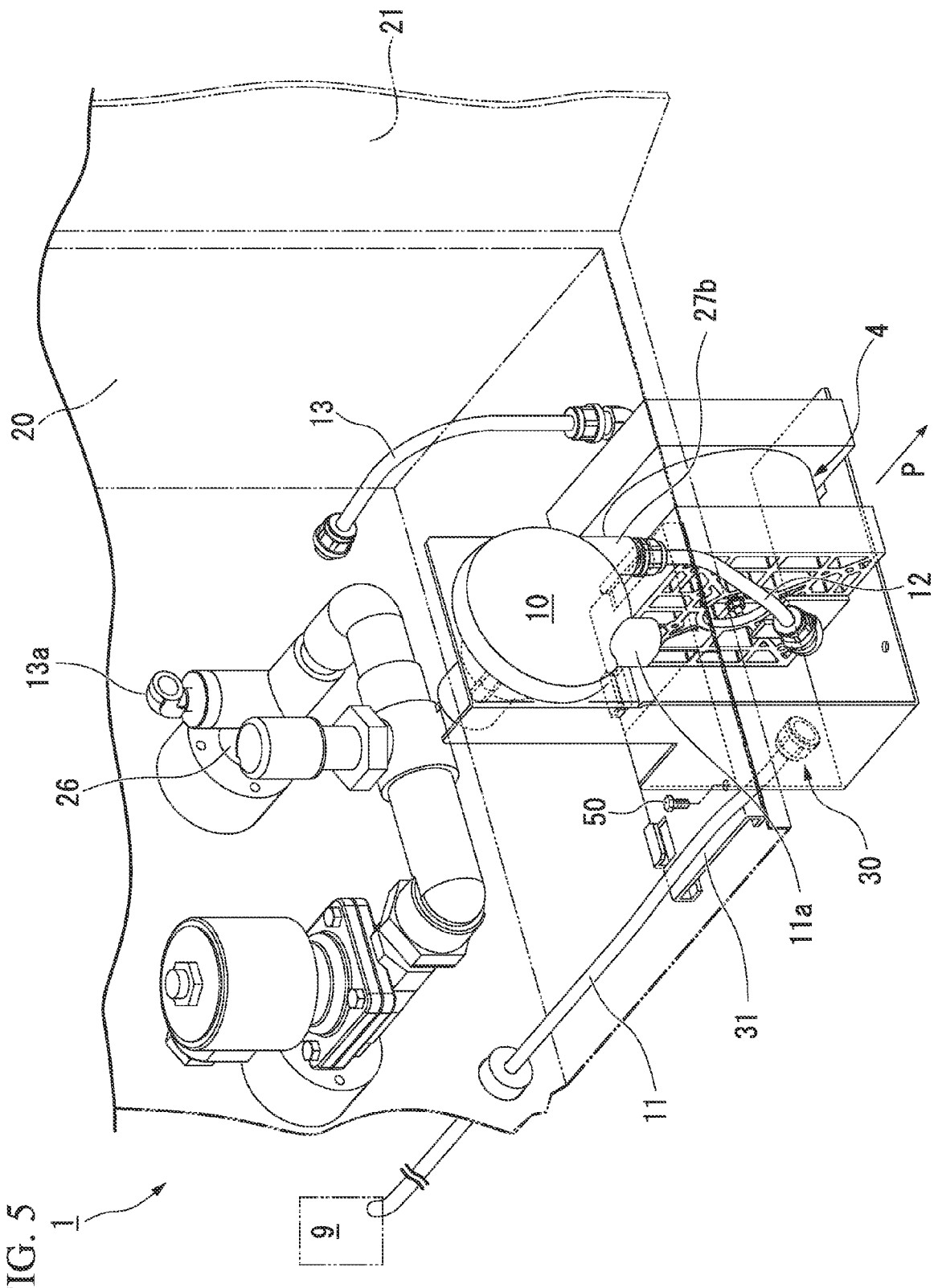
FIG. 5 is a perspective view showing a state in which the bracket of the electrolysis water-making apparatus according to the first embodiment of the present invention is removed from a casing.

Then, as shown in FIG. 5, the first piping 11 is removed from the connection-point 11a of the pump 10, and the hydrochloric acid solution remaining in the first piping 11 flows to the storage tank 9.

Next, the third piping 13 is removed from the connection-point 13a with the dilution method 26. The removed third piping 13 is maintained in a state in which the aperture is directed upward such that the electrolyzed products remaining in the third piping 13 do not spill out.

In this state, the bracket 30 is extracted in front of the casing (the direction of the arrow P). When the bracket 30 is extracted, the electrolytic cell 4 and the pump 10 of each bracket 30 are extracted from the casing 20. Then, the bracket 30 is moved to a place where waste liquid treatment can be easily performed and the hydrochloric acid solution or the like can be discarded, and the electrolyzed products in the third piping 13 are discharged. In addition, the second piping 12 connecting the pump 10 to the electrolytic cell 4 is removed from an inlet 27b of the pump 10, and the hydrochloric acid solution remaining in the second piping 12 is discharged.

Next, the bolts 51 and 51 shown in FIG. 4 are removed to remove the electrolytic cell 4 from the bracket 30. Accordingly, the first sheet material 35a and the second sheet material 35b are separated from each other.

Here, for example, when the electrolytic cell 4 (having a large linear dimension of the body 16 shown in FIG. 6) having a larger treatment capability than the electrolytic cell 4 before the removal is installed, the side plates 15A and 15B of the electrolytic cell 4 after the replacement are fixed to the outside of the casing 20 by the bolts 51 and 51 of the rigid walls 40 and 40 of the first and second sheet materials 35a and 35b. In this way, the bottom wall 35 of the bracket 30 is connected via the electrolytic cell 4, and the electrolytic cell 4 and the pump 10 shown in FIG. 2 are integrally attached to the bracket 30.

Then, similar to FIG. 2, the second piping 12 is connected to an inlet 4a of the electrolytic cell 4 and the delivery 27b of the pump 10. Meanwhile, even in the second base frame 31b shown in FIG. 4, since the linear dimension of the electrolytic cell 4 becomes larger when the electrolytic cell 4 having a small dimension is changed to the electrolytic cell 4 having a large dimension, a position thereof is changed. That is, a bolt (not shown) of the outside fixed plate 25 fixing the second base frame 31b is removed. With respect to the first base frame 31a, the second base frame 31b is moved to a position at which the entire bottom wall 35 of the bracket 30 on which the electrolytic cell 4 having a large dimension shown in FIG. 6 is installed can be placed on the installation base 31, in a direction of an arrow L. After the base frame 31b is moved, bolts are inserted into the through hole of the outside fixed plate 25 and the male screw holes 32 and 32 and secured.

In this state, an end of the bottom wall 35 of the bracket 30 is slidably disposed between an upper surface of the installation base 31 and the catching plates 36 and 36. Then, the bolt 50 is threaded into the through hole 33 and the male screw hole 39 of the installation base 31 shown in FIG. 4 and securely fixed.

After installation of the bracket 30, the first piping 11 is connected to the inlet 27a of the pump 10, and the third piping 13 is connected between the outlet 4b of the electrolytic cell 4 and the dilution method 26. Then, the opening/shutting door of the casing 20 is closed to complete replacement of the electrolytic cell 4.

As described above, according to the electrolysis water-making apparatus 1 of the embodiment, the bracket 30 to which the electrolytic cell 4 is attached and the installation base 31 of the casing 20 at which they are installed can be set to be modified according to the linear dimension of the electrolytic cell 4. For this reason, the electrolytic cell 4 having different treatment capability can be installed at the electrolysis water-making apparatus 1, and the one electrolysis water-making apparatus 1 can appropriately change the manufacturing capacity of electrolyzed water.

In addition, the bracket 30 can be removed, and the pump 10 and the electrolytic cell 4 can be extracted from each bracket 30 to the outside of the casing 20 to perform the waste liquid treatment, and so on. Accordingly, a process of replacing the inside of the pump 10, the electrolytic cell 4, and the first to third pipings 11, 12 and 13 by water can be omitted, the replacement process of the electrolytic cell 4 and the pump 10 can be easily and efficiently performed, and water used in the replacement process can be saved.

Furthermore, the connection-point 11a of the pump 10 and the first piping 11 is installed over the storage tank 9. For this reason, when the first piping 11 is removed from the pump 10, the hydrochloric acid solution in the first piping 11 flows to the storage tank 9 to make it difficult to overflow in the casing 20. In addition, since the connection-point 13a of the third piping 13 and the dilution method 26 is connected to the electrolytic cell 4 at a position higher than the connection-point 13b, when the third piping 13 is removed from the connection-point 13a, the electrolyzed products in the third piping 13 do not easily overflow in the casing 20. Accordingly, a task of cleaning the inside of the casing 20 can be omitted, and the working efficiency of replacement of the electrolytic cell 4 and the pump 10 can be increased.

In addition, since a structure for preventing overflow of the liquid in the electrolytic cell 4 or the pump 10 is simple, the manufacturing cost of the electrolysis water-making apparatus 1 can be decreased.

Furthermore, the bolt 50 of the bracket 30 is removed, the first piping 11 is removed from the inlet 27a of the pump 10, the third piping 13 is removed from the connection-point 13a of the dilution method 26, and thus, the bracket 30 can be extracted from the casing 20. For this reason, a process in the casing 20 can be suppressed to a minimum level, and the replacement process can be easily performed. In addition, the pump 10 and the electrolytic cell 4 can be integrally and easily moved to a place where a process can be easily performed while attached to the bracket 30.

In addition, since the configuration of the bracket 30 and the structure of the installation base 31 to which the bracket 30 is attached are simple, the manufacturing cost of the electrolysis water-making apparatus 1 can be reduced to a low level.

In the embodiment, upon replacement of the pump 10 and the electrolytic cell 4, while the bracket 30 is extracted to the outside of the casing 20 after the first and third pipings 11 and 13 are removed from the respective connection-points 11a and 13a, the linear dimension of the first and third pipings 11 and 13 may be set to be larger, and the bracket 30 may be extracted to the outside of the casing 20 in a state in which the first and third pipings 11 and 13 are connected to the pump 10 and the electrolytic cell 4.

As the above-mentioned configuration is provided, the first and third pipings 11 and 13 can be removed from the casing 20. For this reason, even when the liquid in the piping overflows upon removal of these pipings, contamination of the inside of the casing 20 can be avoided. In addition, when a sheet or a plate is prepared at the outside of the casing 20, a process of removing the first and third pipings 11 and 13 can be more easily performed.

In addition, in the embodiment, while the second sheet material 35b and the second base frame 31b are constituted by separate members, these members may be integrally formed with each other, and the outside fixed plate 25 may be formed at the second sheet material 35b to be directly fixed to the bottom plate 23.

As the above-mentioned configuration is provided, the number of parts of the electrolysis water-making apparatus 1 can be suppressed, and a working process of the electrolytic cell 4 upon the replacement can be reduced.

Next, a second embodiment of the present invention will be described. In the embodiment, like elements in the first embodiment are designated by like reference numerals, and a description thereof will not be repeated here.

Figure 7:
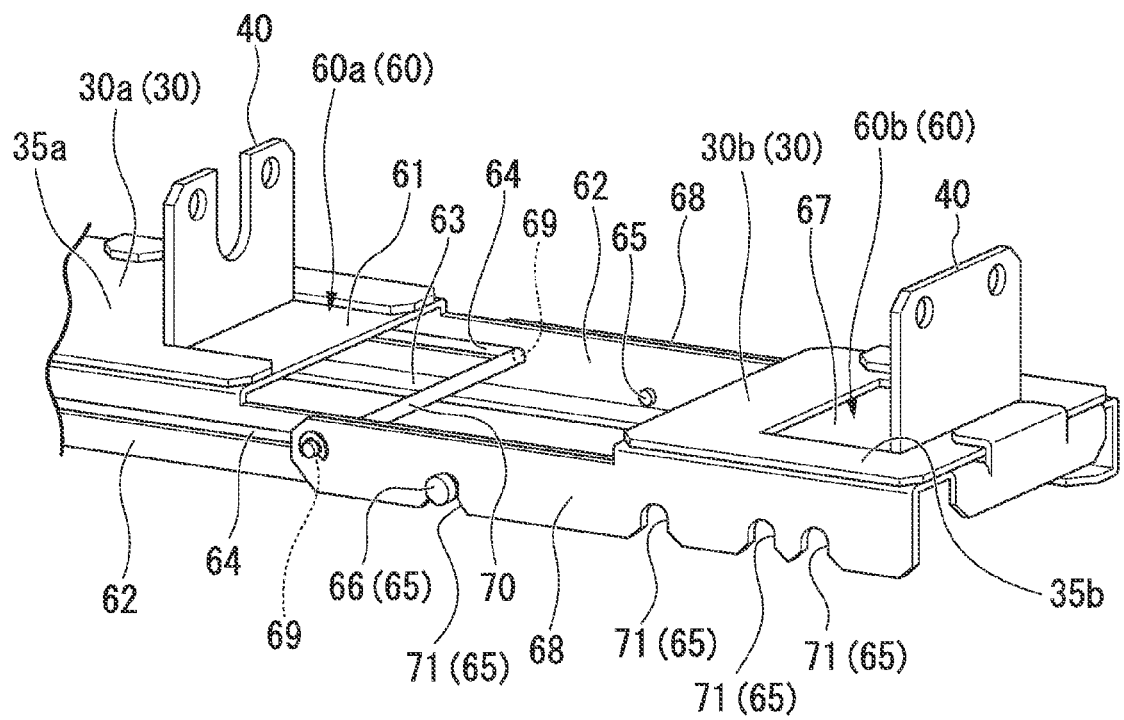
FIG. 7 is a perspective view showing portions of a bracket and an installation base of an electrolysis water-making apparatus according to a second embodiment of the present invention.

As shown in FIG. 7, in an electrolysis water-making apparatus according to the second embodiment, a first base frame 60a of an installation base 60 is flexibly connected to a second base frame 60b. Accordingly, the second embodiment is distinguished from the electrolysis water-making apparatus 1 according to the first embodiment in that the second base frame 60b is extracted from or accommodated in the first base frame 60a.

The first base frame 60a is constituted by a flat plate area 61 having a substantially rectangular shape and on which a first sheet material 30a of a bracket 30 is disposed, side plates 62 and 62 disposed in front of a casing and vertically hanging down from both edges of a rear side thereof, and lower edges 63 and 63 of the plate bent in a direction in which the lower edges approach each other from both ends of the side plates 62 and 62. The first base frame 60a is formed such that the side plates 62 and 62 and the lower edges of the plates 63 and 63 protrude in a direction in which the second base frame 60b is positioned, rather than the flat plate area 61. In the first base frame 60a, the lower edges of the plate 63 and 63 are fixed to the bottom plate 23 of the casing 20 shown in FIG. 2 by welding.

In addition, a slot 64 is formed at a middle section in a width direction of the side plate 62 in a longitudinal direction of the side plate 62. Further, a latching section 66 protruding toward the outside of the side plates 62 and 62 and constituting one side of a fixation mechanism 65 configured to relatively position the second base frame 60b with respect to the first base frame 60a is formed at a front end of the side plate 62.

The second base frame 60b is constituted by a flat plate area 67 having a substantially rectangular shape and on which a second sheet material 30b of the bracket 30 is disposed, and side plates 68 and 68. In the second base frame 60b, the side plate 68 protrudes in a direction of the first base frame 60a rather than the flat plate area 67 and is disposed outside the side plates 62 and 62.

A steel rod 70 having a circular cross-section and rotatably held by a retainer in a state inserted into the entire slots 64 and 64 of the first base frame 60a and passing through holes 69 and 69 formed at front ends of the side plates 68 and 68 is installed at the front ends of the side plates 68 and 68, the second base frame 60b can be extracted and accommodated in an extending direction of the slot 64, and the a steel rod 70 can be rotated about an axis thereof.

Figure 8A:
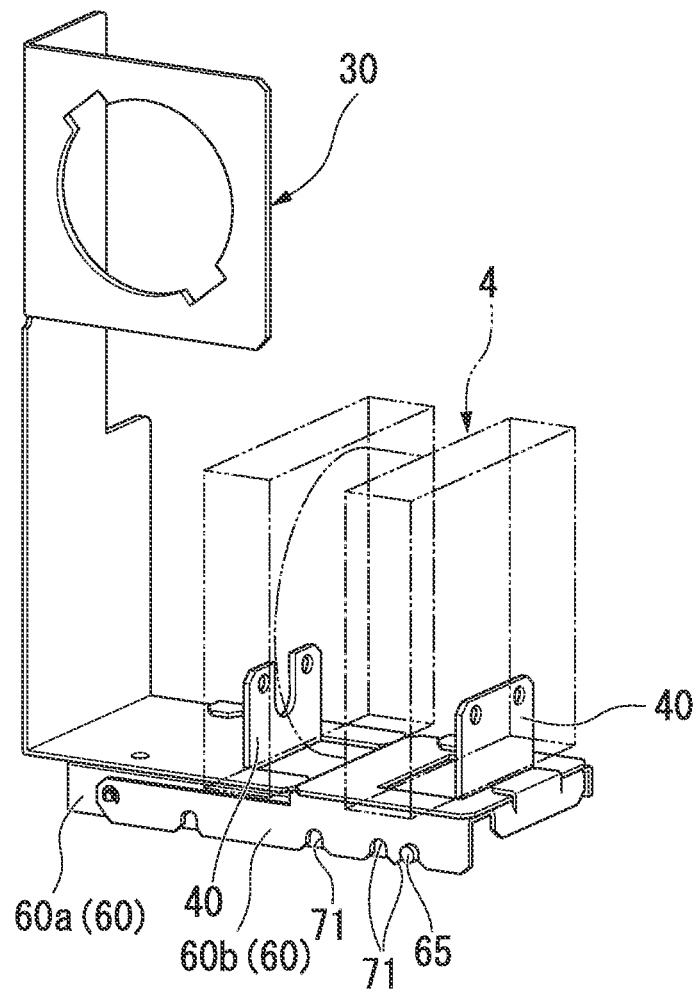
FIG. 8A is a perspective view showing the bracket and the installation base of the electrolysis water-making apparatus according to the second embodiment of the present invention.
Figure 8B:
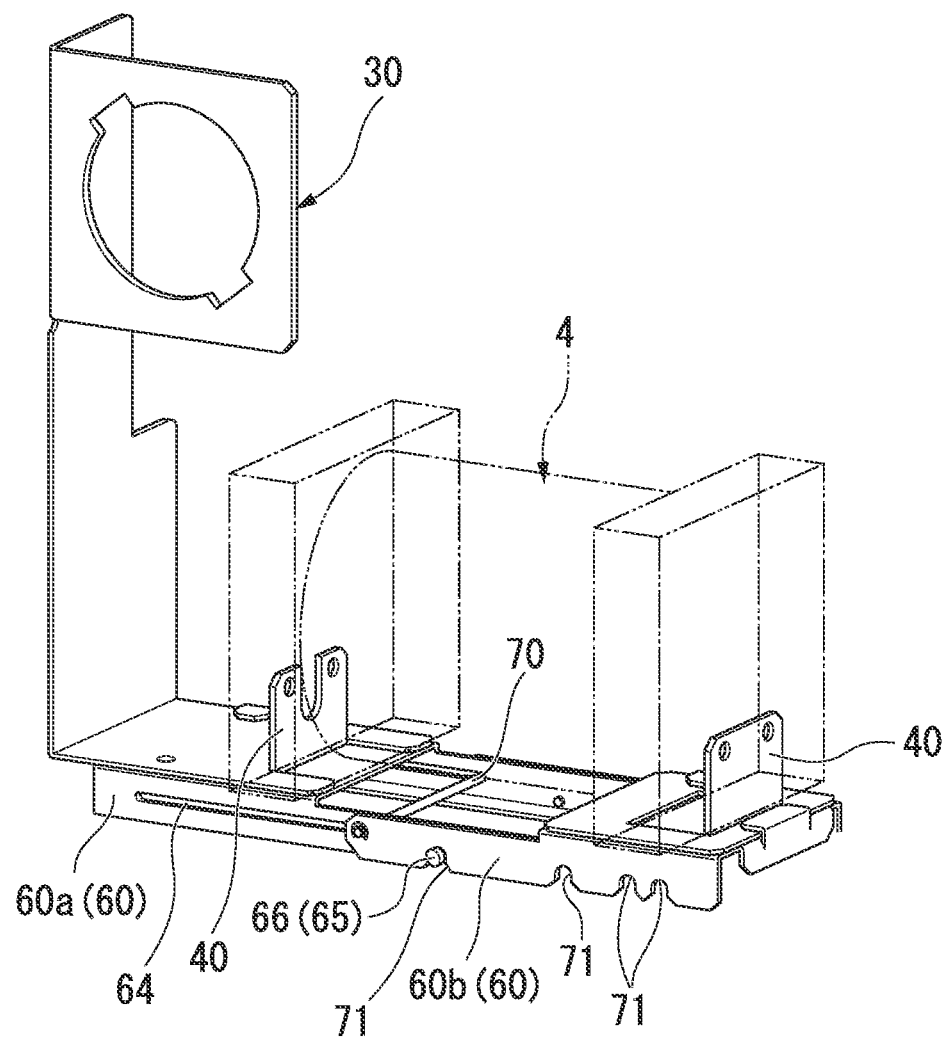
FIG. 8B is a perspective view showing the bracket and the installation base of the electrolysis water-making apparatus according to the second embodiment of the present invention.

Further, cutout sections 71, 71 . . . constituting the other side of the fixation mechanism 65 are formed at lower ends of the side plates 68 and 68 at predetermined intervals. As shown in FIGS. 8A and 8B, the cutout sections 71, 71 . . . are locked by the latching section 66 at a position where the dimension between the rigid walls 40 and 40 is substantially the same as the dimension of various electrolytic cells 4.

In the electrolysis water-making apparatus of the second embodiment, a method of replacing the electrolytic cell 4 is distinguished from the first embodiment in settings of the electrolysis water-making apparatus 1 and the installation base 60 according to the first embodiment.

That is, in order to set the installation base 60 of the second embodiment according to a dimension between the electrolytic cell 4 and the bracket 30 to which the electrolytic cell 4 is attached, after the bracket 30 is removed from the installation base 60, the second base frame 60b is raised upward from the steel rod 70 as a starting point, and engagement between the latching section 66 and the cutout section 71 is released. After that, the second base frame 60b is relatively moved with respect to the first base frame 60a, the second base frame 60b is returned to a horizontal position at a position having a predetermined width dimension, and the engaging section 66 is engaged with the cutout section 71 formed at the position.

Moreover, the bracket 30 attached to the electrolytic cell 4 in the same manner as the electrolysis water-making apparatus 1 according to the first embodiment is attached to the installation base 60 and connects the various pipings 11 and 13, and the opening/shutting door 21 of the casing 20 is closed to complete replacement of the electrolytic cell 4.

According to the electrolysis water-making apparatus 1 of the embodiment, in addition to the same effect that can be obtained by the electrolysis water-making apparatus 1 of the first embodiment, the installation base 60 can be easily set to match the linear dimension of the electrolytic cell 4. Further, when the electrolytic cell 4 is replaced with a new one having a different dimension, a process of fixing the second base frame 60b to the bottom plate 23 of the casing 20 one by one can be omitted.

Next, a third embodiment of the present invention will be described. In the embodiment, like elements from the first and second embodiments are designated by like reference numerals, and a description thereof will not be repeated here.

Figure 9:
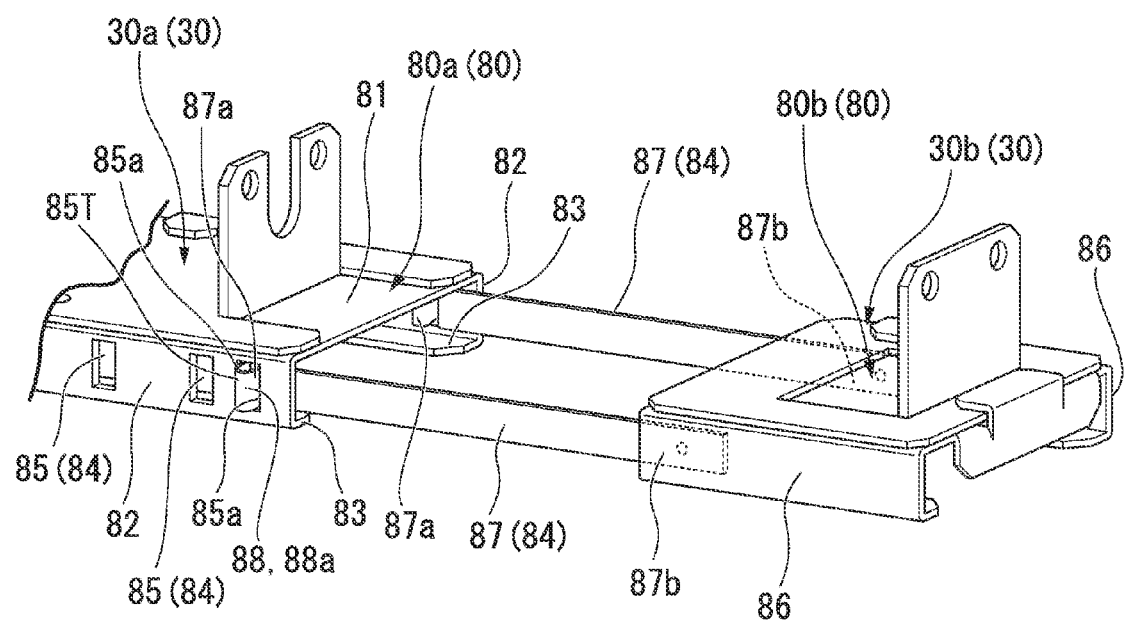
FIG. 9 is a perspective view showing portions of a bracket and an installation base of an electrolysis water-making apparatus according to a third embodiment of the present invention.

As shown in FIG. 9, in an electrolysis water-making apparatus according to the third embodiment, a first base frame 80a of an installation base 80 is flexibly connected to a second base frame 80b. Accordingly, the installation base 60 in the second embodiment is similar to the third embodiment in that the second base frame 80b is extracted from and accommodated in the first base frame 80a to adjust a length thereof. However, the electrolysis water-making apparatus according to the third embodiment is different in a fixation mechanism.

The first base frame 80a is formed by a flat plate area 81 having a substantially rectangular shape, side plates 82 and 82 disposed in front of the casing and hanging down from both ends of a rear side thereof, and lower edges 83 and 83 of the plate bent in a direction in which both edges approach each other from both ends of the side plates 82 and 82. The lower edges 83 and 83 of the plate are fixed onto the bottom plate 23 shown in FIG. 2 by welding.

Latching holes 85, 85 . . . having a substantially rectangular shape and forming one side of a fixation mechanism 84 are formed at the side plates 82 and 82 of the first base frame 80a at predetermined intervals.

The second base frame 80b has substantially the same shape as the first base frame 80a. The second base frame 80b has a flat spring 87 fixed to inner surface sides of the side plates 86 and 86, extending to the entire first base frame 80a side, and forming the other side of the fixation mechanism 84, instead of having a hole of the latching hole 85 in the side plate 86.

The flat spring 87 is configured to have a latching section 88. The latching section 88 has a slightly smaller width dimension than a dimension in the vertical direction of the latching hole 85, and is formed as will be described below. That is, a base end side 87b is fixed to inner surfaces of the side plates 86 and 86, extends toward the first base frame 80a, and expands from inner surfaces of the side plates 82 and 82 toward outer surfaces in a front end 87a. The expanded portion protrudes from the latching hole 85 to be latched by the latching hole 85. In addition, the flat springs 87 and 87 can be elastically deformed in a direction in which the flat springs 87 and 87 approach each other between the side plates 82 and 82 of the first base frame 80a from a base end 87b fixed to the side plates 86 and 86 as a starting point. The flat springs 87 and 87 are configured to be elastically deformed when the latching section 88 is disposed at a position abutting the inner surface of the side plate 82 and to be elastically recovered when the latching section 88 is disposed at the latching hole 85 to be engaged with the latching hole 85.

In the electrolysis water-making apparatus of the third embodiment, a method of replacing the electrolytic cell 4 is distinguished from the electrolysis water-making apparatus according to the second embodiment in settings of the installation base 80.

In order to set the installation base 80 of the third embodiment to match a dimension between the electrolytic cell 4 and the bracket 30 to which the electrolytic cell 4 is attached, the bracket 30 is removed from the installation base 80. After that, the second base frame 80b is extracted from the first base frame 80a or pressed toward the first base frame 80a side to bring an expanding surface 88a of the latching section 88 of the flat spring 87 in contact with an aperture edge 85a of the latching hole 85 and slides, releasing engagement between the latching section 88 and the latching hole 85.

Figure 10A:
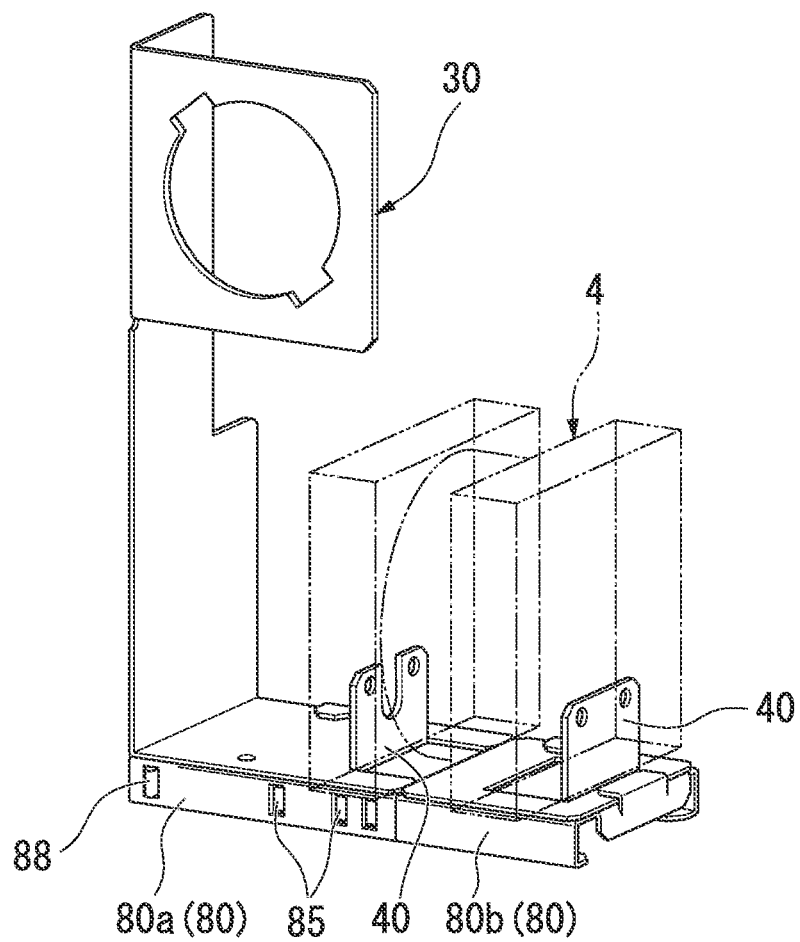
FIG. 10A is a perspective view showing the bracket and the installation base of the electrolysis water-making apparatus according to the third embodiment of the present invention.
Figure 10B:
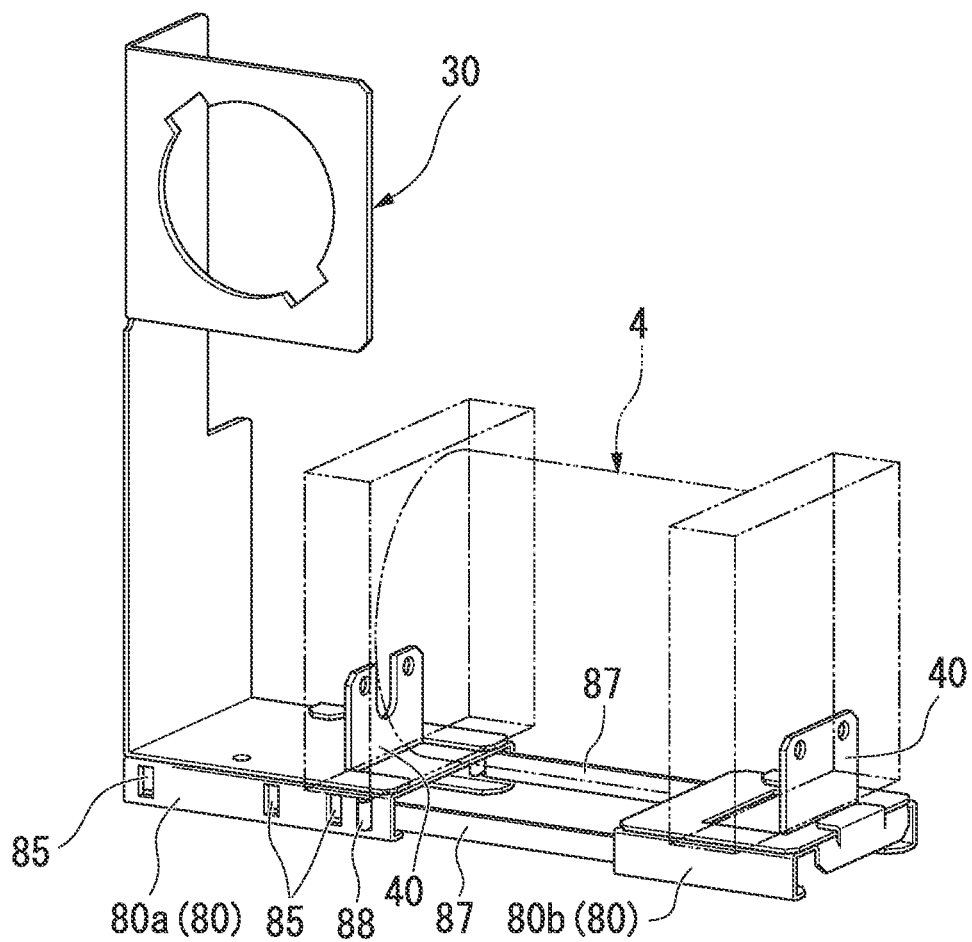
FIG. 10B is a perspective view showing the bracket and the installation base of the electrolysis water-making apparatus according to the third embodiment of the present invention.

Here, an expended apex 85T of the latching section 88 abuts the inner surface of the side plate 82, and the flat spring 87 is elastically deformed. In this state, the second base frame 80b is moved. When the latching section 88 is disposed at the neighboring latching hole 85, the flat spring 87 is elastically recovered so that an engaging section 88 protrudes to be engaged in the latching hole 85. For this reason, as the engagement of the fixation mechanism 84 is repeated to move the second base frame 80b to a desired position, for example, as shown in FIGS. 10A and 10B, the installation base 80 can be set to match the bracket 30 to which the electrolytic cell 4 having a different dimension is attached.

As described above, in the embodiment, since engagement and disengagement of the fixation mechanism 84 can be repeated by only pressing or extracting the second base frame 80b in a desired direction and the installation base 80 can be installed, the dimension of the installation base 80 can be easily adjusted.

In addition, even in the embodiment, the same effects that can be obtained by the electrolysis water-making apparatus 1 of the first embodiment can be obtained.

Next, a fourth embodiment of the present invention will be described. In the embodiment, like elements in the first to third embodiments are designated by like reference numerals, and a detailed description thereof will not be repeated here.

Figure 11A:
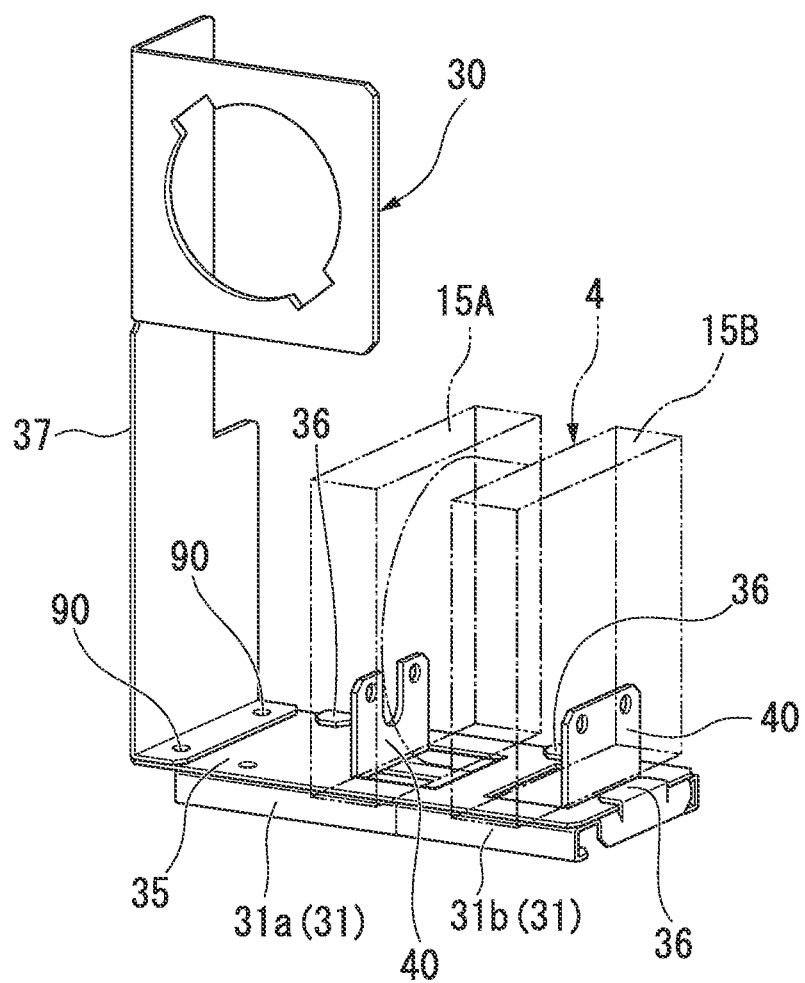
FIG. 11A is a perspective view showing a bracket and an installation base of an electrolysis water-making apparatus according to a fourth embodiment of the present invention.
Figure 11B:
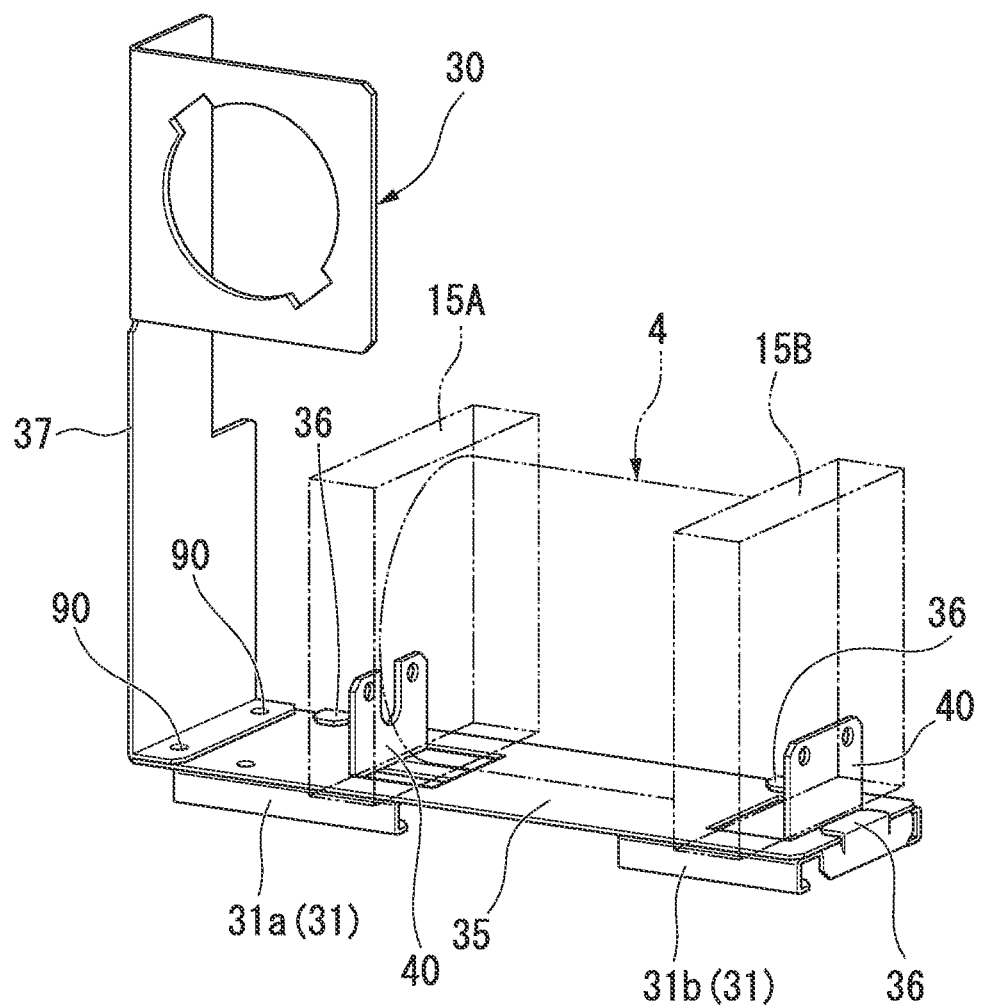
FIG. 11B is a perspective view showing the bracket and the installation base of the electrolysis water-making apparatus according to the fourth embodiment of the present invention.

As shown in FIGS. 11A and 11B, an electrolysis water-making apparatus according to the fourth embodiment is distinguished from the first to third embodiments in that the entire bottom wall 35 of the bracket 30 is integrally formed, a plurality of kinds of dimensions between the rigid walls 40 and 40 formed to match the dimension of the electrolytic cell 4 are provided, and the entire bottom wall 35 is replaced to correspond to the dimension of the electrolytic cell 4.

The entire bottom wall 35 of the bracket 30 is integrally formed of a sheet material. The bottom wall 35 is fixed to a lower end of the side wall 37 by fixtures 90 and 90 such as a screw and so on.

The bracket 30 is disposed between the first and second base frames 31a and 31b, and fixed by the catching plates 36, 36 . . . and the bolt 50.

In the embodiment, when the electrolytic cell 4 is replaced with the electrolytic cell 4 having a different dimension, the bracket 30 is removed from the installation base 31. Further, as the fixtures 90 and 90 are removed, the bottom wall 35 is removed from the side wall 37. After that, the electrolytic cell 4 is attached to the bottom wall 35 having a dimension between the rigid walls 40 and 40 appropriate for the dimension of the newly attached electrolytic cell 4 and fixed to the side wall 37 so that replacement of the electrolytic cell 4 is performed.

Attachment to the installation base 31 is similar to the electrolysis water-making apparatus 1 according to the first embodiment. In the embodiment, instead of the installation base 31, the installation base 60 or 80 according to the second or third embodiment may be used.

In the embodiment, the dimension between the rigid walls 40 and 40 is previously formed to match the dimension between the side plates 15A and 15B of the electrolytic cell 4. For this reason, since replacement efficiency of the electrolytic cell 4 can be increased and configuration of the bottom wall 35 becomes simple without necessity of dimension adjustment of the bottom wall 35, manufacturing cost of the bracket 35 can be suppressed.

Next, a fifth embodiment of the present invention will be described. In the embodiment, like elements from the first embodiment are designated by like reference numerals, and a detailed description thereof will not be repeated here.

Figure 12:
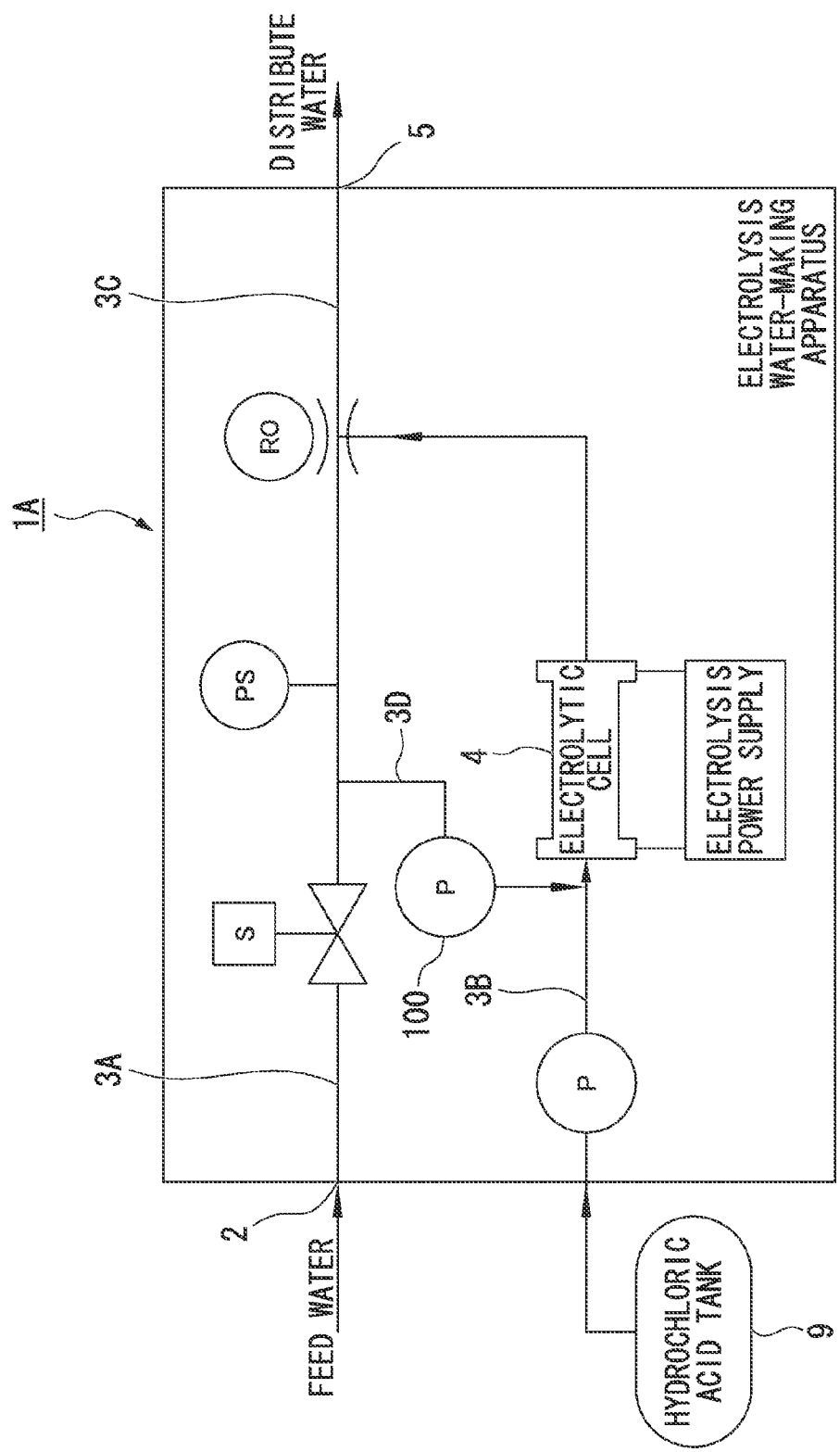
FIG. 12 is a view schematically showing a configuration of an electrolysis water-making apparatus according to a fifth embodiment of the present invention.

As shown in FIG. 12, an electrolysis water-making apparatus 1A according to the fifth embodiment includes a hydrochloric acid dilution line 3D in addition to the configuration of the electrolysis water-making apparatus 1 according to the first embodiment. The hydrochloric acid dilution line 3D has a starting end branched from the raw water line 3A, and a terminating end joined to an upstream side of the electrolytic cell 4 in the electrolyzed products line 3B. Further, the hydrochloric acid dilution line 3D includes a dilution water feed pump 100.

The dilution water feed pump 100 extracts raw water from the raw water line 3A, and mixes the raw water with a hydrochloric acid solution before electrolysis. The dilution water feed pump 100 can appropriately adjust a concentration of the hydrochloric acid solution supplied into the electrolytic cell 4.

Figure 13:
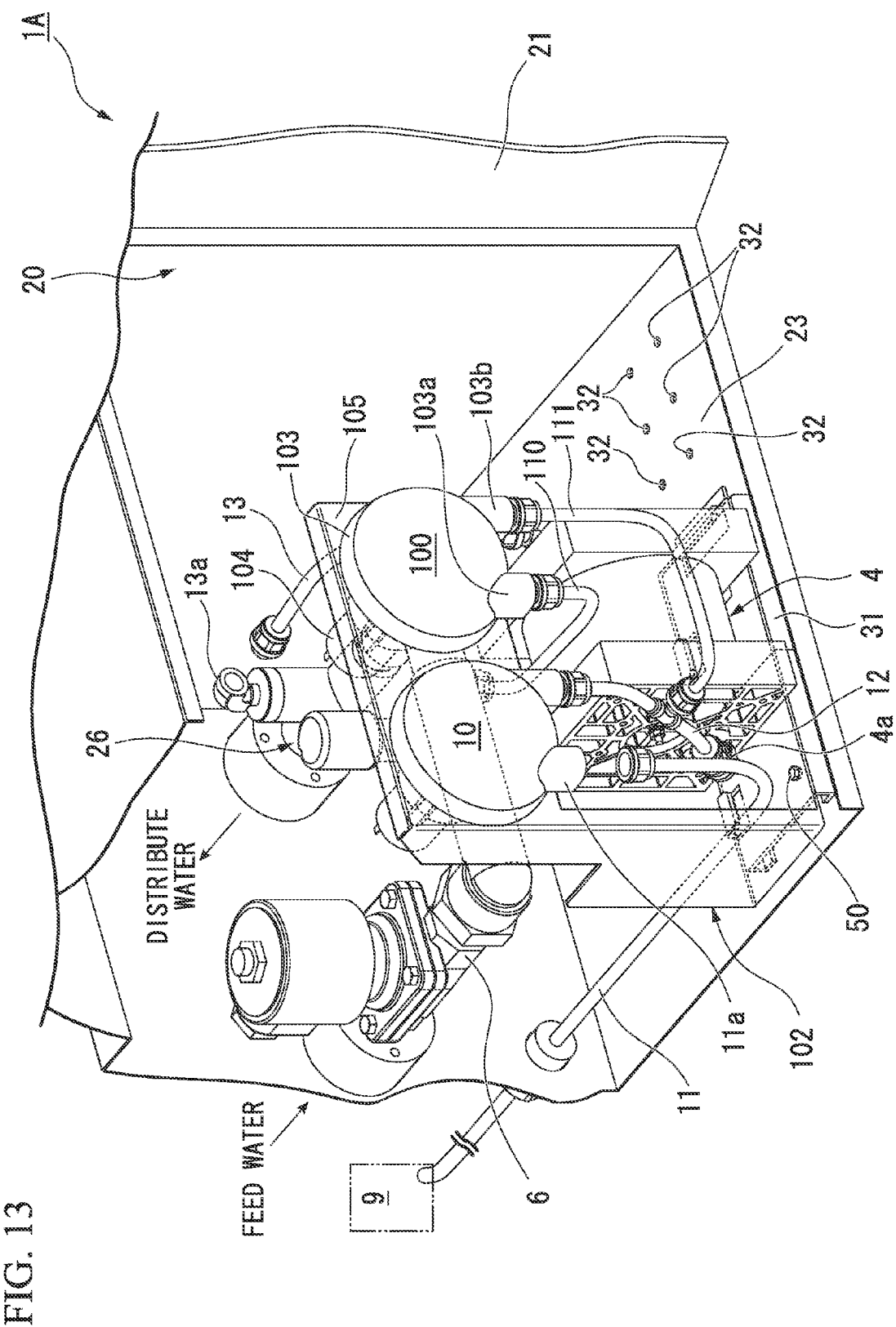
FIG. 13 is a perspective view showing the inside of the electrolysis water-making apparatus according to the fifth embodiment of the present invention.
Figure 14:
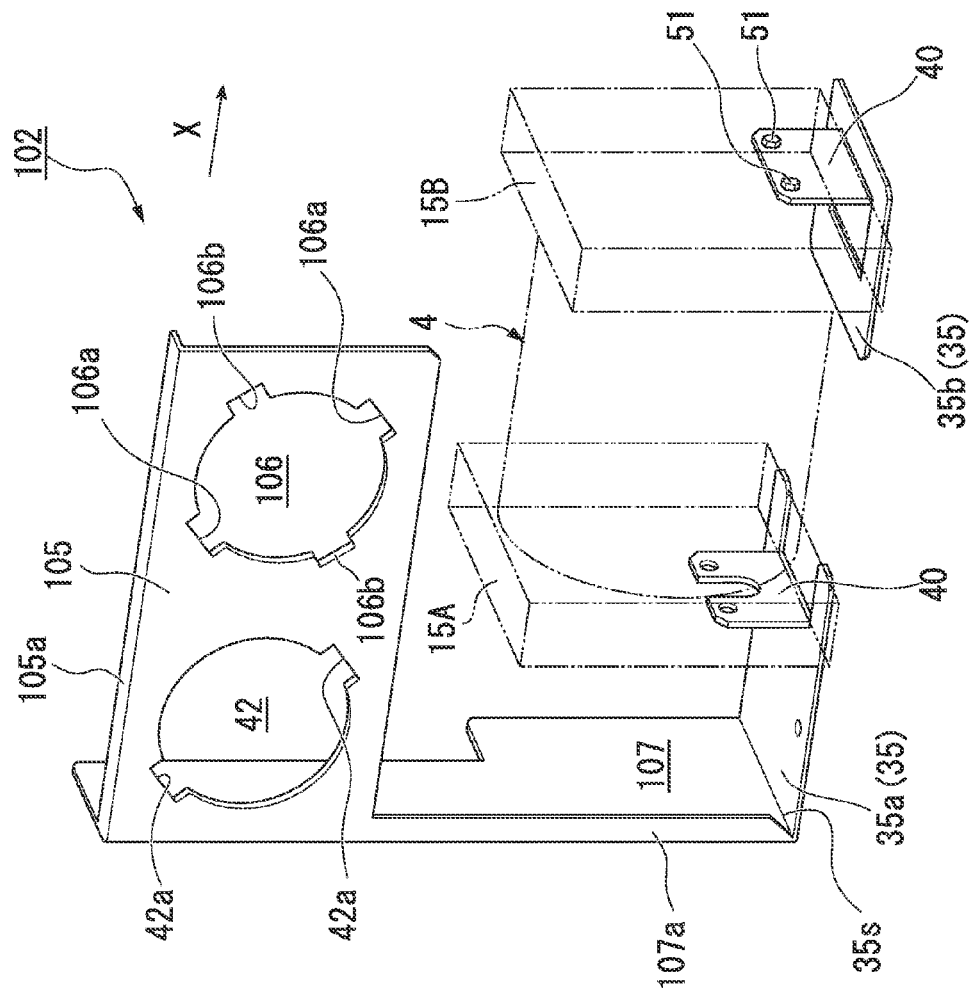
FIG. 14 is an exploded perspective view showing a bracket of the electrolysis water-making apparatus according to the fifth embodiment of the present invention.

As shown in FIGS. 13 and 14, the electrolysis water-making apparatus 1A according to the fifth embodiment includes the dilution water feed pump 100 in addition to the configuration of the electrolysis water-making apparatus 1 according to the first embodiment. The electrolysis water-making apparatus 1A according to the embodiment is distinguished from the electrolysis water-making apparatus 1 of the first embodiment in that a bracket 102 is configured to be capable of holding the dilution water feed pump 100 adding to the electrolytic cell 4 and a raw material solution feed pump 10.

The dilution water feed pump 100 suctions dilution water from the water supply line 6, and delivers the dilution water into the second piping 12 connected to the inlet 4a of the electrolytic cell 4. The dilution water feed pump 100 has the same configuration of the pressure pump 10 configured to pump the hydrochloric acid solution. That is, the dilution water feed pump 100 includes a pump body 103 having a disc shape, and an actuator 104. The pump body 103 accommodates a tube and a rotor configured to rotate a roller to crush the tube, and moves the diluted water in the tube by rotation of the rotor. The actuator 104 drives the rotor. An inlet 103a configured to suction the diluted water and a delivery 103b configured to pump the diluted water toward the second piping 12 are formed under the pump body 103.

A fourth piping 110 is connected between the inlet 103a of the pump 100 and the water supply line 6. A fifth piping 111 is connected between the delivery 103b and the second piping 12.

As shown in FIG. 14, the bracket 102 has an aperture 42 configured to hold the pump 10 at a pump fixing portion 105, and an aperture 106 configured to hold the pump 100. In addition, the bracket 102 includes a fastener such as a bolt, a clip, or the like (not shown) configured to hold the pumps 10 and 100.

A pair of hooks 106a and 106a and a pair of hooks 106b and 106b are formed at the aperture 106. Then, on the other hand, a pair of catching plates (not shown) snap-fitted to the hooks 106a or the hooks 106b protrude to a rear side (a side in contact with the pump fixing portion 105) of the pump body 103 of the pump 100. The hooks 106a or the hooks 106b are fitted to the catching plates of the pump 100 to reach a location at which the pump 100 is installed.

When the pump 100 is attached to the bracket 102, first, the actuator 104 is inserted into the aperture 106. Here, a pair of catching plates (not shown) formed at the rear side of the pump body 103 are inserted to be fitted to the pair of hooks 106a and 106a formed at the aperture 106. Accordingly, an angle of the pump 100 with respect to the bracket 102 always has a certain angle, and the pump 100 is prevented from being pivoted with respect to the bracket 102.

Then, the pump fixing portion 105 is sandwiched by a fastener such as a bolt or a clip (not shown) installed at the pump body 103 and the pump fixing portion 105 to appropriately fix the pump 100.

In addition, in the above-mentioned example, while a pair of catching plates (not shown) are fitted to the pair of hooks 106a and 106a, the catching plates may be fitted to the pair of hooks 106b and 106b.

The pair of hooks 106b and 106b are formed at a position where a straight line connecting the hooks 106b and 106b is substantially perpendicular to a straight line connecting the hooks 106a and 106a. For this reason, when the catching plates of the pump 100 are fitted to the hooks 106b and 106b, the pump 100 is attached at an angle rotated 90 degrees counterclockwise (when seen from a front side of the casing or a side of the pump body 103) in comparison with the case in which the catching plates are fitted to the hooks 106a and 106a.

In this state, the inlet 103a and the delivery 103b shown in FIG. 13 are directed in a direction of an arrow X shown in FIG. 14. For this reason, since there is no interference with the electrolytic cell 4 when a process of connecting or removing the fourth piping 110 and the fifth piping 111 is performed, workability can be further improved.

In addition, a side wall 107 of the bracket 102 is a wall section vertically standing upward from an edge 35s of a side portion of the bottom wall 35. The side wall 107 includes a bent section 107a configured to prevent the side wall 107 from being bent due to weights of the pumps 10 and 100 when the pumps 10 and 100 are attached to the pump fixing portion 105.

In addition, a bent section 105a is also formed at an upper end of the pump fixing portion 105. The bent section 105a prevents the pump fixing portion 105 from being bent due to the weights of the pumps 10 and 100 when the pumps 10 and 100 are attached thereto.

As shown in FIG. 13, in order to replace the electrolytic cell 4, the pressure pump 10 configured to pump the hydrochloric acid solution, and the dilution water feed pump 100 of the electrolysis water-making apparatus 1A, the bolt 50 of the bracket 102 is removed, and the bracket 102 can be extracted.

The first piping 11 is removed from the connection-point 11a of the pump 10 to return the hydrochloric acid solution to the storage tank 9. The third piping 13 and the fourth piping 110 are removed in the connection-point 13a of the dilution method 26 and a connection-point 103a of the water supply line 6 side, respectively. Then, apertures of the third and fourth the pipings 13 and 110 are maintained upward.

In this state, the bracket 102 to which the electrolytic cell 4 and the pumps 10 and 100 are attached is extracted to the outside of the casing 20 to discard the chloride solution and electrolyzed products in the piping. Further, the second and fifth pipings 12 and 111 are removed, and a member required to be replaced is replaced with a new one, which is then fixed to the bracket 102.

Then, the second and fifth pipings 12 and 111 are connected again, and the bracket 102 is installed at/fixed to the installation base 31 in the casing 20. Next, the first, third and fourth pipings 11, 13 and 110 are connected to predetermined connection points to close the opening/shutting door 21 of the casing 20, completing replacement of the member.

As described above, according to the electrolysis water-making apparatus 1A of the fifth embodiment, even when the fifth piping 111 and the dilution water feed pump 100 are connected to the second piping 12 configured to deliver the hydrochloric acid solution to the electrolytic cell 4 to complicate a connecting relation of the piping, only the minimum piping connected to the storage tank 9 and the water supply line 6 is removed, and the electrolytic cell 4 and the pumps 10 and 100 are integrally and easily transported to the outside of the casing 20 by the bracket 102, enabling the replacement process.

Then, the electrolytic cell 4 and the pumps 10 and 100 can be integrally transported to the outside of the casing 20 by the bracket 102. For this reason, since the piping configured to connect the respective members is removed, waste liquid treatment becomes easy, and the inside of the casing 20 is cleaned by the chloride solution and electrolyzed products with no contamination, a working efficiency can be increased.

In addition, similar to the effects obtained by the electrolysis water-making apparatus 1 according to the first embodiment, since the configuration of the bracket 102 is simple, manufacturing cost of the electrolysis water-making apparatus 1A can be suppressed.

Further, since the connection-points 103a and 103b of the pump 100 are fixed to be horizontally disposed with respect to the bracket 102, layout of the piping becomes free to easily secure a working space.

INDUSTRIAL APPLICABILITY

According to the electrolysis water-making apparatus of the present invention, the electrolytic cells having various dimensions can be assembled to one electrolysis water-making apparatus, and the manufacturing capacity of electrolyzed water can be changed. In addition, the attachment process of the electrolytic cell can be performed outside the casing, and the replacement process of the electrolytic cell can be easily performed.

DESCRIPTION OF REFERENCE NUMERALS 1, 1A electrolysis water-making apparatus
4 electrolytic cell
9 storage tank
10 pump
11 first piping
11a connection-point
13 third piping
13a connection-point
20 casing
23 bottom plate
26 dilution method
30 bracket
31a first base frame
31b second base frame
40 rigid walls
60a first base frame
60b second base frame
65 fixation mechanism
80a first base frame
80b second base frame
84 fixation mechanism
100 dilution water feed pump
102 bracket
106 aperture
106a hook
106b hook
110 fourth piping
111 fifth piping

The invention claimed is:

1. An electrolysis water-making apparatus for generating electrolyzed products by supplying a raw material solution into an electrolytic cell to perform electrolysis from a storage tank configured to store the raw material solution, generating electrolyzed water by diluting the electrolyzed products, and diluting the generated electrolyzed water by an electrolysis water supply line, the electrolysis water-making apparatus comprising:
    a casing having an inner wall surface that defines a space inside the casing, and being configured to accommodate the electrolytic cell; and
    a bracket provided with an attachment portion capable of being attached to the inner wall surface of the casing, and configured to be fixed to the inner wall of the casing in a freely detachable manner,
    wherein the bracket comprises a bottom wall provided with first and second rigid walls, the first rigid wall attached to a first side plate of the electrolytic cell at one end and the second rigid wall attached to a second side plate of the electrolytic cell at the other end of the electrolytic cell and a side wall vertically standing up from the bottom wall,
    the first and second rigid walls have a dimension therebetween that is adjustable according to a length of the electrolytic cell,
    the side wall is provided with a pump fixing portion formed in an upper part of the side wall, and
    a pressure pump configured to pump the raw material solution into the electrolytic cell is attached to pump fixing portion at a height greater than the storage tank and the electrolytic cell.

2. The electrolysis water-making apparatus according to claim 1, further comprising a dilution water feed pump configured to pump dilution water into the electrolytic cell, wherein the dilution water feed pump is attachable to the bracket.

3. The electrolysis water-making apparatus according to claim 2, wherein the dilution water feed pump is attached to the bracket at a variable angle.

4. The electrolysis water-making apparatus according to claim 1, wherein the casing comprises:
    a main body casing;
    a first base frame fixed to a bottom plate of the main body casing; and
    a second base frame installed at the first base frame in a freely disjunctive manner, and fixed to the bottom plate in a freely detachable manner,
    the first rigid wall is fixed to the first base frame, and the second rigid wall is fixed to the second base frame.

5. The electrolysis water-making apparatus according to claim 1, wherein the casing comprises:
    a main body casing;
    a first base frame fixed to a bottom plate of the main body casing;
    a second base frame installed at the first base frame in a freely disjunctive manner, and fixed to the bottom plate in a freely detachable manner; and
    a plurality of brackets having different dimensions between the first and second rigid walls according to the linear dimension of the electrolytic cell, and the bracket is fixed between the first and second base frames in a state in which the electrolytic cell is fixed.

6. The electrolysis water-making apparatus according to claim 1, wherein the casing comprises:
   a main body casing;
   a first base frame fixed to a bottom plate of the main body casing;
   a second base frame flexibly installed with respect to the first base frame; and
   a fixation mechanism configured to fix the first and second base frames at an original position.

7. An electrolysis water-making apparatus for generating electrolyzed products by supplying a raw material solution into an electrolytic cell to perform electrolysis from a storage tank configured to store the raw material solution, generating electrolyzed water by diluting the electrolyzed products, and diluting the generated electrolyzed water by an electrolysis water supply line, the electrolysis water-making apparatus comprising:
   a casing having an inner wall surface that defines a space inside the casing, and being configured to accommodate the electrolytic cell; and
   a bracket provided with an attachment portion capable of being attached to the inner wall surface of the casing, and configured to be fixed to the inner wall of the casing in a freely detachable manner,
   wherein the bracket comprises a bottom wall provided with a pair of rigid walls to which one end and the other end of the electrolytic cell are attached and a side wall vertically standing up from the bottom wall and spaced from the electrolytic cell,
   the pair of rigid walls have a dimension therebetween that is adjustable according to a length of the electrolytic cell,
   the side wall is provided with a pump fixing portion formed in an upper part of the side wall, and
   a pressure pump configured to pump the raw material solution into the electrolytic cell is attached to pump fixing portion at a height greater than the storage tank and the electrolytic cell.

8. The electrolysis water-making apparatus according to claim 7, further comprising a dilution water feed pump configured to pump dilution water into the electrolytic cell, wherein the dilution water feed pump is attachable to the bracket.

9. The electrolysis water-making apparatus according to claim 8, wherein the dilution water feed pump is attached to the bracket at a variable angle.

10. The electrolysis water-making apparatus according to claim 7, wherein the casing comprises:
    a main body casing;
    a first base frame fixed to a bottom plate of the main body casing; and
    a second base frame installed at the first base frame in a freely disjunctive manner, and fixed to the bottom plate in a freely detachable manner,
    one of the pair of rigid walls is fixed to the first base frame, and
    the other of the rigid walls is fixed to the second base frame.

11. The electrolysis water-making apparatus according to claim 7, wherein the casing comprises:
    a main body casing;
    a first base frame fixed to a bottom plate of the main body casing;
    a second base frame installed at the first base frame in a freely disjunctive manner, and fixed to the bottom plate in a freely detachable manner; and
    a plurality of brackets having different dimensions between the rigid walls according to the linear dimension of the electrolytic cell, and
    the bracket is fixed between the first and second base frames in a state in which the electrolytic cell is fixed.

12. The electrolysis water-making apparatus according to claim 7, wherein the casing comprises:
    a main body casing;
    a first base frame fixed to a bottom plate of the main body casing;
    a second base frame flexibly installed with respect to the first base frame; and
    a fixation mechanism configured to fix the first and second base frames at an original position.

* * * * *